US010743393B2

(12) United States Patent
Meade et al.

(10) Patent No.: US 10,743,393 B2
(45) Date of Patent: Aug. 11, 2020

(54) ENHANCED COMMUNICATION MODULE FOR LIGHTING CONTROL

(71) Applicant: ORION ENERGY SYSTEMS, INC., Manitowoc, WI (US)

(72) Inventors: Marc Meade, Manitowoc, WI (US); Peter David Joseph, Manitowoc, WI (US); Matthew David Gresen, Manitowoc, WI (US)

(73) Assignee: ORION ENERGY SYSTEMS, INC., Manitowoc, WI (US)

( * ) Notice: Subject to any disclaimer, the term of this patent is extended or adjusted under 35 U.S.C. 154(b) by 0 days.

(21) Appl. No.: 16/240,376

(22) Filed: Jan. 4, 2019

(65) Prior Publication Data
US 2019/0208607 A1    Jul. 4, 2019

Related U.S. Application Data

(60) Provisional application No. 62/613,512, filed on Jan. 4, 2018.

(51) Int. Cl.
*H05B 47/19*    (2020.01)
*H05B 39/04*    (2006.01)
(Continued)

(52) U.S. Cl.
CPC .......... *H05B 47/19* (2020.01); *H05B 39/041* (2013.01); *H05B 47/105* (2020.01); *H05B 47/185* (2020.01)

(58) Field of Classification Search
CPC ............ H05B 37/0272; H05B 37/0227; H05B 39/041
See application file for complete search history.

(56) References Cited

U.S. PATENT DOCUMENTS

2011/0062888 A1*  3/2011  Bondy ................... H05B 45/10
                                                            315/294
2013/0033330 A1*  2/2013  Longstone ............. H03B 19/00
                                                            331/40
(Continued)

OTHER PUBLICATIONS

Cut Sheet for DIM10-250-11 Wireless Lighting Controller from Synapse Wireless, DOC-1000067-C-0, *Synapse Wireless, Inc.*, available at <https://help.synapsewireless.com/Lighting/Assets/Cut_Sheets/DIM10-250-11_CutSheet.pdf> (2018).

*Primary Examiner* — Amy Cohen Johnson
*Assistant Examiner* — Jianzi Chen
(74) *Attorney, Agent, or Firm* — Marshall, Gerstein & Borun LLP

(57) ABSTRACT

A lighting control module (LCM) includes an input configured to receive, from a sensor, a signal indicative of motion and/or occupancy, and to output a first corresponding signal. The LCM includes a microprocessor to receive the first corresponding signal from the input and, in response, transmit a second corresponding signal. A wireless transceiver is communicatively coupled to the microprocessor and configured to communicate with other LCMs. A relay is configured to selectively provide power to an output that is configured to be electrically coupled to a fixture. The relay is configured to selectively provide the power to the output according to a first relay-control signal from the microprocessor. The LCM also includes a regulated power supply, a power input configured to couple the power supply to an external power source, and a dimming module configured to be coupled to the fixture and to, when coupled to the fixture, output a signal to the fixture. The LCM is configured to receive from the sensor the signal, and in response to the signal cause the fixture to change its state of operation.

19 Claims, 17 Drawing Sheets

(51) Int. Cl.
    *H05B 47/105*       (2020.01)
    *H05B 47/185*       (2020.01)

(56) References Cited

U.S. PATENT DOCUMENTS

| | | | | |
|---|---|---|---|---|
| 2014/0265897 | A1* | 9/2014 | Taipale | H05B 47/18 |
| | | | | 315/200 R |
| 2016/0057838 | A1* | 2/2016 | Maros | H05B 47/18 |
| | | | | 315/291 |
| 2016/0065085 | A1* | 3/2016 | Hamamoto | H05B 45/20 |
| | | | | 315/200 R |
| 2017/0201130 | A1* | 7/2017 | Park | H02J 50/90 |

* cited by examiner

ENHANCED COMMUNICATION MODULE FOR LIGHTING CONTROL

FIELD OF DISCLOSURE

The present disclosure generally relates to a lighting control system. More specifically, the disclosure relates to an adaptable apparatus and system for controlling and providing electrical power to lighting equipment.

BACKGROUND

A variety of environments and facilities use lighting system technology to aid in operating light fixtures to illuminate a space. Certain lighting control systems can be configured to regulate and monitor a light fixture, the level of illumination provided by the fixture, and/or the duration of illumination of the light fixture. Integrating a sensor into a lighting system enables an environment to be partially or fully illuminated only when occupied, during peak-demand periods, or whenever otherwise desired by an end user. In addition to these functional benefits, such lighting systems are more energy efficient, reduce electrical power consumption, extend the lifetime of equipment, and are cost-effective.

FIG. 1 depicts a conventional, prior art lighting system 100 that includes a sensor 102 specifically configured to provide power, via a mains power source 104, to a lamp assembly 106 to illuminate a physical space. The lamp assembly 106 includes a driver or ballast 108 and a lamp 110. Generally, the power source 104, the sensor 102, and the lamp assembly 106 are wired together by conventional wiring in the manner depicted in FIG. 1, with neutral and ground wires (112 and 114, respectively) electrically coupling the power source 104 and the lamp assembly 106. A voltage carrying ("hot") wire 116 carries power from the power source 104 to the sensor 102 to power the sensor, which selectively allows power from the power source 104 to flow to the lamp assembly 106 via a switched wire 118 (i.e., the sensor 102 acts as a switch). In some cases, the sensor 102 may also have a ground wire (not shown).

When the sensing device detects motion or occupancy, a switch in the sensor 102 closes to conduct power from the hot wire 116 to the switched wire 118, powering the lamp assembly 106. In some sensors 102, a delay timer can be programmed to switch off the power to the lamp assembly 106 after a programmed delay time expires without detected motion or occupancy, while in other sensors, the delay time is fixed (or there is no delay time).

In general, the installation of any additional control components requires rewiring of the system 100 and, in many instances, replacing the sensor 102 and/or the lamp assembly 106 with a component designed specifically to be interoperable with the additional control components.

SUMMARY OF THE DISCLOSURE

The apparatus, systems, and methods described herein relate to a lighting control module configured to intelligently regulate and monitor one or more light fixtures using a motion and/or occupancy sensor.

The lighting control module described herein is configured, in various embodiments, to be easily integrated or adapted into both new or existing lighting systems, and to provide an end user the ability to modify or retrofit a lighting system's equipment or functionality without having to rewire a system or replace all components of the system. The lighting control module, which receives power from a mains power source, is coupled to a sensor and a lamp assembly.

In a first embodiment, a lighting control module includes a first input configured to receive, from a sensor, a sensor signal indicative of motion and/or occupancy, and in response to the sensor signal, to output a first corresponding signal. The lighting control module also includes a microprocessor configured to receive the first corresponding signal from the first input and in response to receiving the first corresponding signal, transmit a second corresponding signal. A wireless transceiver is communicatively coupled to the microprocessor and configured to communicate with one or more other lighting control modules. A relay of the lighting control module is configured to selectively provide power to a relay output that is configured to be electrically coupled to a lighting fixture. The relay is configured to selectively provide the power to the relay output according to a first relay-control signal from the microprocessor. The lighting control module also includes a regulated power supply, a power input configured to couple the regulated power supply to an external power source, and a dimming module configured to be coupled to a lighting fixture and further configured to, when coupled to the lighting fixture, output a signal to the lighting fixture. The lighting control module is configured to receive from the sensor the sensor signal, and in response to the sensor signal cause the lighting fixture to change its state of operation.

In another embodiment, a system includes a sensor, a lighting fixture, and a lighting control module coupled to the lighting fixture and the sensor, and to an external power source. The lighting control module includes a first input configured to receive from the sensor a sensor signal indicative of motion and/or occupancy and in response to the sensor signal, output a first corresponding signal. The lighting control module also includes a microprocessor configured to receive the first corresponding signal from the first input and in response to receiving the first corresponding signal, transmit a second corresponding signal. A wireless transceiver in the lighting control module is communicatively coupled to the microprocessor and configured to communicate with one or more other lighting control modules. The lighting control module further includes a relay configured to selectively provide power to a relay output that is configured to be electrically coupled to a lighting fixture. The relay is configured to selectively provide the power to the relay output according to a first relay-control signal from the microprocessor. A regulated power supply, and a power input configured to couple the regulated power supply to the external power source, are also included in the lighting control module, as is a dimming module configured to be coupled to a lighting fixture and further configured to, when coupled to the lighting fixture, output a signal to the lighting fixture. The lighting control module is configured to receive from the sensor the sensor signal, and in response to the sensor signal cause the lighting fixture to change its state of operation.

BRIEF DESCRIPTION OF THE DRAWINGS

The features and advantages of the apparatus and system described herein will be best appreciated upon reference to the following detailed description and the accompanying drawings, in which.

DETAILED DESCRIPTION

Figure 1:
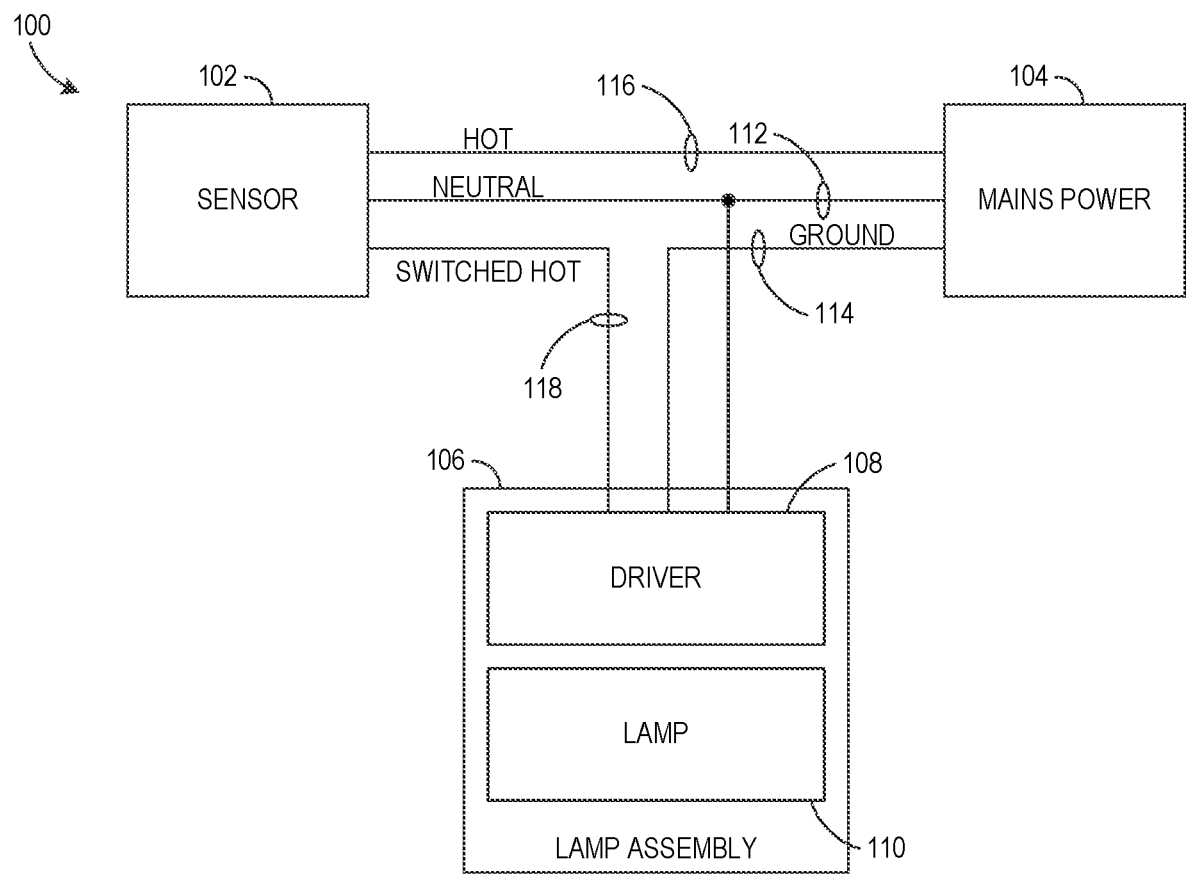
FIG. 1 depicts a conventional, prior art lighting system.
Figure 2:
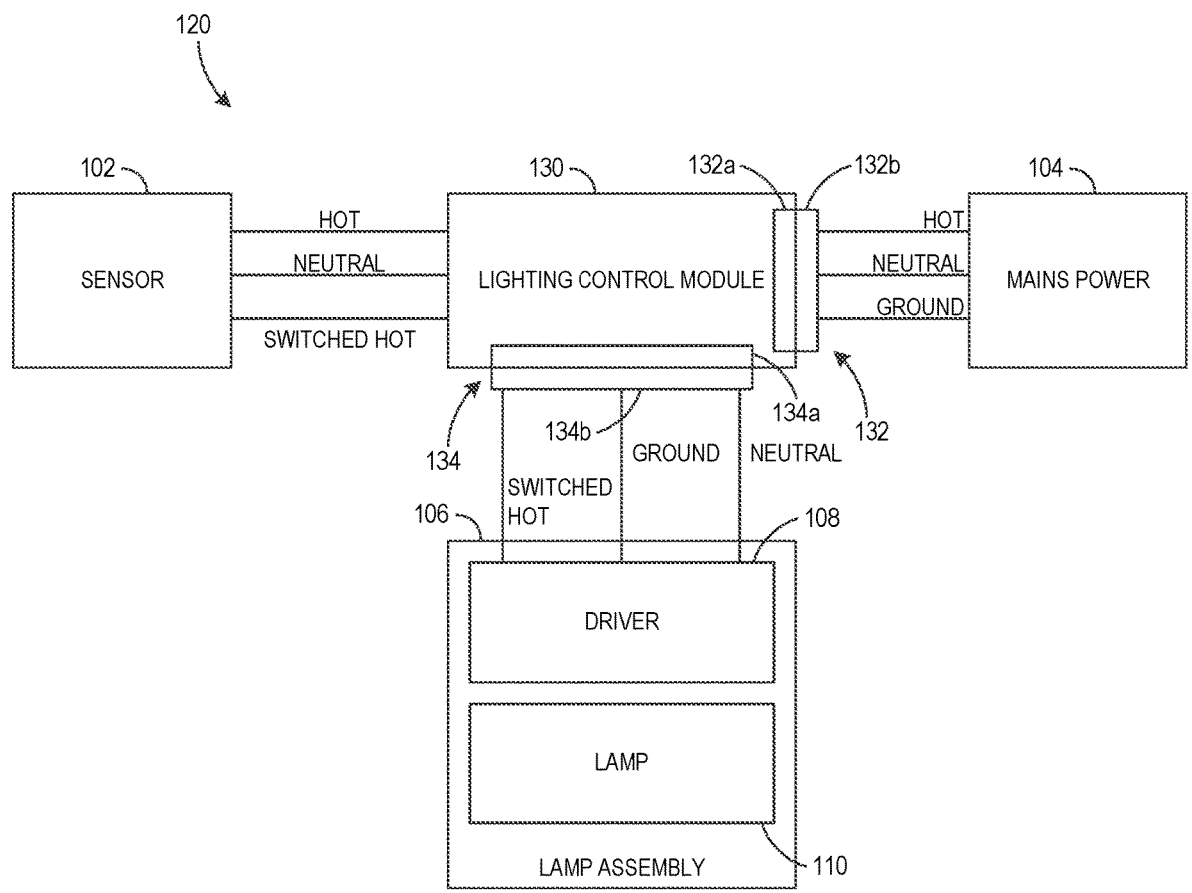
FIG. 2 is a block diagram depicting the disclosed lighting control module in the context of the disclosed system.

FIG. 2 depicts a generalized block diagram of the disclosed lighting control module in the context of the disclosed system. In contrast to the prior art lighting system 100 depicted in FIG. 1, FIG. 2 depicts a lighting system 120 in which a lighting control module (LCM) 130 is disposed between the mains power 104, the sensor 102, and the lamp assembly 106. As will become clear throughout the description below, by integrating functionality into the LCM 130, the lighting system 120 may be improved without requiring rewiring or replacement of the sensor 102, the mains power 104, the lamp assembly 106, or any of the associated wiring. In fact, use of the LCM 130 may allow virtually any lighting device, equipment, and/or functionality to be installed, modified, or retrofitted easily and efficiently. Unlike the prior art light system depicted in FIG. 1, in certain embodiments (described in greater detail below), the LCM 130 is configured to function as an adapter, allowing any of a variety of sensors to functionally control any of a variety of lamp assemblies. While prior art lighting systems, as depicted in FIG. 1, require modifying the hardware and/or connections to alter or adapt a lighting system, in certain embodiments the lighting system 120 depicted in FIG. 2 requires only installation of or modification of the functionality at the LCM 130. Additionally, any one of the components external to the LCM 130 (e.g., the sensor 102, the mains power source 104, or the lamp assembly 106) may be replaced merely by disconnecting the component from the LCM 130 and connecting the new component in its place, without substantively affecting the operation or interoperability of the remaining components or the LCM 130 itself.

The LCM 130 is, in various embodiments, configured to control the local lamp assembly 106 according to detected parameters of the sensor 102. However, the LCM 130 may also be configured to communicate wirelessly with lighting control modules connected to other lamp assemblies, allowing the LCM 130 to change the state of the lamp assembly 106 according to the states of lamp assemblies in other lighting fixtures, according to sensors coupled to other lamp assemblies, according to remote sensors, according to instructions received from lighting control modules coupled to other lamp assemblies, etc., or to cause a change in the states of lamp assemblies in such other lighting fixtures, according to the programming of the LCM 130 (e.g., by communicating with a light control module coupled to the other lighting fixtures). Further, some embodiments of the LCM 130 allow an end user to remotely program the functionality of the LCM 130, of other lighting control modules, and/or of the lighting system 120.

In embodiments, the LCM 130 may provide functionality unrelated to the function of the sensor 102. For instance, and as described herein, the LCM 130 may allow additional control modes for the lamp assembly 106 that do not rely on the sensor 102 or signals received from other lighting control modules. Further, the LCM 130 may be configured to provide power to auxiliary devices, to control auxiliary devices, to perform other environmental analyses, to control the lighting fixture according, at least in part, to connected auxiliary devices, and the like. In fact, the LCM 130 may function without a sensor 102 at all and, in embodiments, the sensor 102 is entirely optional, as the LCM 130 may control the lamp assembly 106 according to signals received from other lighting control modules, or according to signals received from other devices coupled to the LCM 130, as will be described below.

In other embodiments, the LCM 130 may provide functionality related to the function of the sensor 102, without using data from the sensor 102 to determine the state of the associated lamp assembly 106. The LCM 130 may use data from the sensor 102 for non-lighting related purposes (e.g., security) without adjusting the state of the lamp assembly according to whether, for example, motion is detected.

Referring still to FIG. 2, the power source 104, though interchangeably referred to herein as "mains power" may be any power source suitable for powering the LCM 130 and the components to which the LCM 130 is electrically coupled, which include at least the sensor 102 and the lamp assembly 106. Power sources that are suitable for providing such power include power sources with sufficient voltage and current capacity as determined by the particular requirements of the sensor 102, the lamp assembly 106, and the configuration of the LCM 130 (including, for example, microprocessor and transceiver components) itself. Though mains power (e.g., 120 VAC, 240 VAC, or 277 VAC at 60 Hz, in the United States) is typically employed for lighting installations, the power source 104 may, in other embodiments, include batteries (especially batteries electrically coupled to a recharging power source such as a generator, solar panels, etc.), generators, solar power sources, wind power sources, etc.

The sensor 102 is generally configured to monitor a parameter of an environment and/or physical space and, when the monitored parameter meets some criteria, output a corresponding signal (e.g., provide power, provide an indicator signal, etc.) to a lamp assembly. In the lighting system 120, the corresponding "switched hot" signal output by the sensor 102 is transmitted to the lamp assembly 106 via the LCM 130. While lighting systems such as the lighting system 120 depicted in FIG. 2 generally employ sensors detecting motion and/or occupancy, the sensor 102 may be any sensor measuring a physical parameter by which a user wishes to effect control of the lighting system 120. Such sensors include, by way of example and not limitation, motion sensors, occupancy sensors, ambient lighting sensors, and acoustic detectors to name only a few. It should be appreciated that throughout this disclosure the terms sensor and sensing device are used interchangeably. Throughout this disclosure an embodiment in which the sensor 102 is configured to detect motion and/or occupancy is commonly discussed, however, it should be appreciated this is a non-limiting embodiment provided merely as an example.

The sensor 102 may be a non-dimming sensor, in which the output of the sensor 102 provides on-off functionality. That is, the power output from the sensor 102 to the lamp assembly 106 is either on (full power) or off (no power). Alternatively, the sensor 102 may be a dimming sensor, in which the output of the sensor 102 is variable according to programming of the sensor 102. The output of the sensor 102, when the sensor 102 is a dimming sensor, may be a variable AC signal, or may be a variable control signal (e.g., 4-20 mA, 0-5 V DC, 0-10 V DC, etc.) causing an intermediary device (such as the LCM 130) to control the illumination level of the lamp assembly 106. For embodiments in which the sensor 102 is a dimming sensor, the lighting system 120 will have a plurality of modes of operation including a deactivated (i.e. non-illuminated, "light off") state and multiple activated (i.e. illuminated, "light on") states with varying illumination levels. Thus, when the sensor 102 detects the sensed parameter meets the programmed conditions, such as sensing occupancy or motion, expiration of a delay timer, lack of occupancy or motion, etc., the sensor 102 will output a signal that effectively causes the lamp 110 to switch from one state of operation to another state of operation, thereby modifying the output illumination level of the lamp 110. A manufacturer may pre-program or an end-user may configure the functionality of the sensor 102.

The lamp assembly 106 itself may be any type of lamp assembly installed or contemplated for installation, provided that it is compatible with the power provided by the power source 104 (directly, or through adaptation provided by the LCM 130). As depicted, such lamp assemblies typically include one or more drivers or ballasts 108 for conditioning and/or limiting the power delivered to the one or more respective lamps 110. The lamp 110 may include any type of lamp including, without limitation, light emitting diode (LED) arrays, single LEDs, high-intensity discharge (HID) lamps (including fluorescent lamps, neon lamps, mercury- or sodium-vapor lamps, arc lamps, etc.), and incandescent lamps. Additionally, the lamp 110 may include multiple lamps (e.g., a single ballast may drive multiple fluorescent tubes, a single driver may drive an array or multiple arrays of LEDs, etc.). Moreover, while a single driver 108 is depicted, the lamp assembly 106 may include multiple drivers 108, each electrically coupled to one or more lamps 110. Of course, the lamp assembly 106 may include various other components such as housings, reflectors, and modular electrical coupling mechanisms.

As depicted in FIG. 2, the LCM 130 may be electrically (and, optionally, physically) coupled to the power source 104 and to the lamp assembly 106 by modular connectors 132 and 134, respectively. Each of the modular connectors 132 and 134 may include a first portion 132a, 134a electrically coupled to the LCM 130, and a second portion 132b, 134b electrically coupled, respectively, to the power source 104 and the lamp assembly 106, such that when the respective first and second portions are coupled, an electrical connection is established between the LCM 130 and the respective components (e.g., physical and electrical coupling of the portion 132a to the portion 132b causes electrical coupling of the power source 104 to the LCM 130). The first portions 132a and 134a may be physically integrated into the LCM 130 (e.g., may be part of a housing (not shown in FIG. 2)). Though not shown, in some embodiments similar modularity may be provided for the connection between the sensor 102 and the LCM 130. As will be described in greater detail, additional "adaptor" components may also be included in the modular connectors. The use of the modular connectors generally facilitates easy connection of the LCM 130 to the sensor 102, the power source 104, and/or the lamp assembly 106, as well as easy replacement of the various components should such replacement be necessary or desired.

Figure 3:
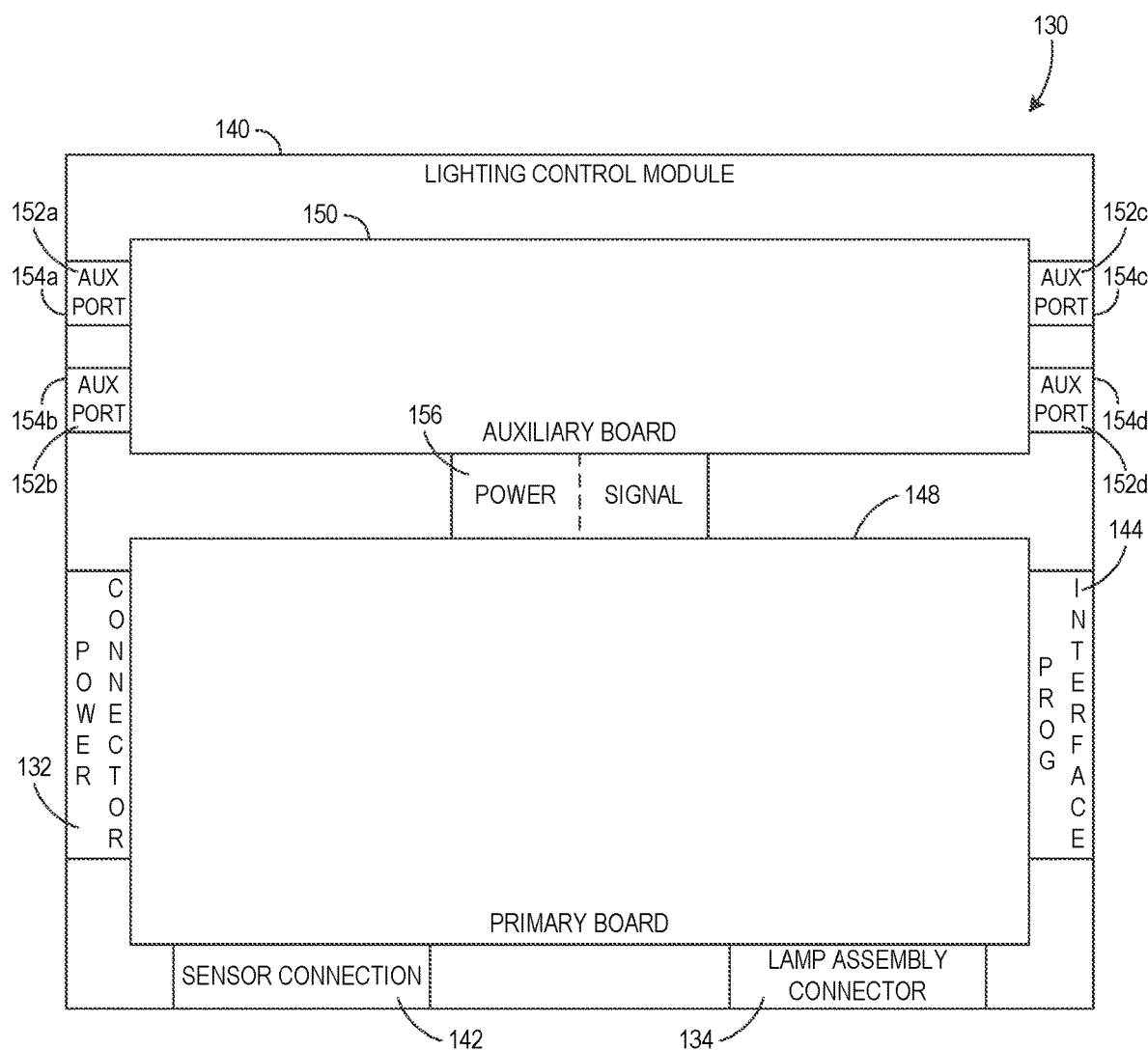
FIG. 3 depicts a high-level architecture of an embodiment of the lighting control module of FIG. 2.

FIG. 3 depicts the LCM 130 as a generalized block diagram depicting various high-level components that will each later be described in greater detail. The LCM 130 generally includes a housing 140 in which the various components are enclosed. The housing 140 may, in various embodiments, be hermetically sealed so that the LCM 130 is impervious to moisture, but need not be so sealed in all embodiments. The housing 140 generally protects the components of the LCM 130 from the environment and from electrical hazards that might damage the components (e.g., electrical discharge), may provide an aesthetically pleasing package, may facilitate mounting of the LCM 130 to the lamp assembly 106, may facilitate mounting of the sensor 102 to the LCM 130, and may facilitate coupling of the LCM 130 to various auxiliary devices.

A variety of openings or ports may be disposed in the housing 140. Generally, the housing 140 may include openings for the modular connectors 132 and 134. In particular, the portions 132a and 134a of the modular connectors 132 and 134 may be disposed in, or may be integrated into, the housing 140. The housing 140 also preferably includes means 142 for connecting the sensor 102 to the LCM 130, which means may include a modular connector (similar to the modular connectors 132 and 134), screw terminals, spring-loaded terminals, or any type of known or future-developed termination type. While many sensors use two- or three-wire configurations, and are configured to be connected (e.g., to power sources and lamps) by terminating loose wires, the present disclosure contemplates that some sensor devices may include modular connectors.

The sensor connection means 142 may include termination points for multiple types of sensors, such as, for example, including termination points for both dimming and non-dimming sensor varieties. Additionally, the sensor connection means 142 may include termination points for sensor types that are not configured to sense motion and/or occupancy, but rather are configured to detect ambient light, acoustic phenomenon, or the like, if those sensors require inputs to or outputs from the LCM that differ from those required by standard motion/occupancy sensors. Where sensors are employed and/or contemplated that are atypical sensors (e.g., sensors that do not output a voltage intended to drive a lamp, the LCM 130 may be adapted to receive a signal from the sensor 102 and to react according to the signal. For instance, the LCM 130 may include, instead of or in addition to standard sensor inputs, an input adapted to carry/receive a 4-20 mA signal, a 0-5 or 0-10 V signal, or another type of signal, and the board adapted (e.g., by programming of a processor) to respond to the signal by controlling the lamp assembly in a programmed manner.

In some embodiments, the housing 140 may include an opening for a programming interface 144 port to which a programming interface 144 may be communicatively coupled, or for a programming interface itself to be disposed therein. As will be described elsewhere in this application, the LCM 130 may be programmed, in various embodiments, by external devices that may communicatively connect to the LCM 130 via a physical connection that may available through the opening. In alternate embodiments, the LCM 130 may be programmed via a user interface (e.g., a display, buttons, etc.) disposed on the LCM 130, which may be available to the user through, or be disposed in, the opening.

Inside the housing 140, the LCM 130 comprises a primary set of components which may be, but need not necessarily be, disposed on a printed circuit board 148. The functionality and the components associated with the primary set of components will be described with respect to FIGS. 4-9. In embodiments, the LCM 130 includes an auxiliary module 150 that provides supplemental functionality such as, for example, providing power to, and/or communication with, additional devices (not shown in FIG. 3). Accordingly, access to one or more auxiliary ports 152*a-d* may be provided in the housing 140 via corresponding openings 154*a-d*. The auxiliary module 150 may be a second printed circuit board (e.g., a "daughter board" or "riser board") electrically (and, in embodiments, communicatively and/or physically) coupled to the primary printed circuit board 148 (or, in general, to the primary set of components) via one or more connectors 156. Of course, while FIG. 3 depicts that the auxiliary module 150 includes four auxiliary ports 152*a-d*, different embodiments may include more or fewer auxiliary ports.

Figure 4:
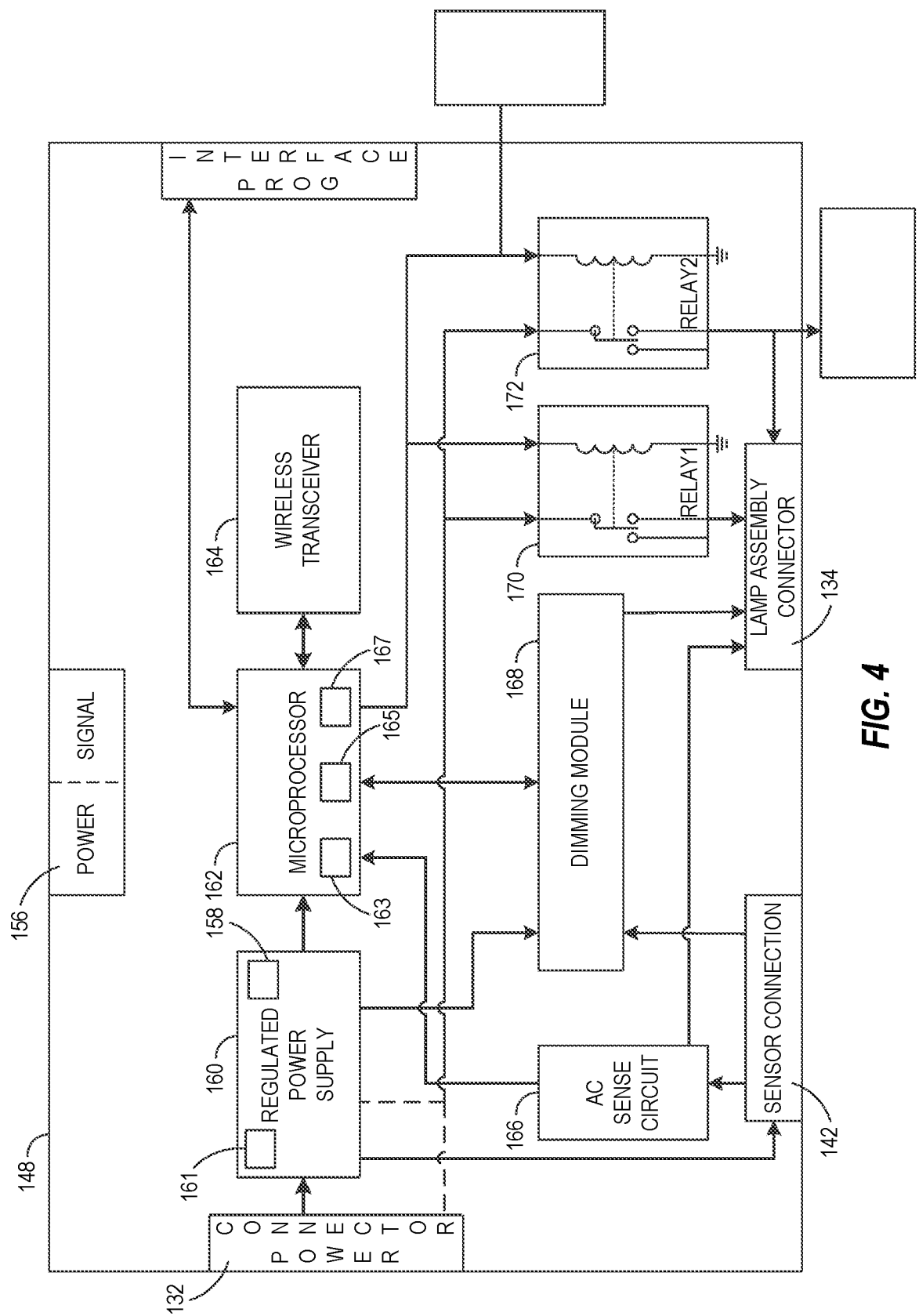
FIG. 4 depicts a block diagram of an exemplary motherboard of the lighting control module.

Turning now to FIG. 4, a block diagram of an exemplary motherboard 148 is depicted including an exemplary primary set of components. While the motherboard 148 depicted in FIG. 4 depicts a variety of components, it should be understood that in various embodiments some of the components depicted in FIG. 4 may be omitted. Additionally, while FIG. 4 is described in the context of the printed circuit board 148 on which the primary set of components is disposed, it will be understood that in alternate embodiments the primary set of components may not be disposed on a printed circuit board, or may be disposed on multiple printed circuit boards.

In any event, the exemplary primary set of components depicted in FIG. 4 includes a regulated power supply 160, a microprocessor 162, a wireless transceiver 164, an AC sense circuit 166, a dimming module 168, and first and second relays 170 and 172, respectively.

The regulated power supply 160 is configured to receive power from the power supply 104 via the power connector 132, and to supply regulated power to the other components in the LCM 130 (e.g., to the microprocessor 162, the wireless transceiver 164, etc.) as well as to the sensor 102 via the sensor connection means 142 and to the lamp assembly 106 via the lamp assembly connector 134. Of course, the regulated power supply 160 may be configured to supply different voltages to the various components as required. For example, the regulated power supply 160 may provide 3.3 V and/or 5 V to the microprocessor 162, may provide 1.8 V and/or 3.3 V to the wireless transceiver 164, may provide 5 V (or 12 V, 120 VAC, 277 VAC, etc.) to the lamp assembly 106, and may provide one, multiple, or all of these voltages to the sensor 102.

In embodiments, the regulated power supply 160 may also be configured to provide transient voltage surge suppression (TVSS) circuitry 158 to protect the components, including the lamp assembly 106. The TVSS circuitry 158 may be included in the regulated power supply 160 and/or may be wired in parallel with the regulated power supply 160 and the lamp assembly 106. In particular embodiments, the TVSS circuitry 158 is configured to provide 10 kA of surge suppression. Thus, by adding the LCM 130 to a particular light fixture, the LCM 130 may automatically protect the light fixture from damaging power surges that may especially affect low voltage fixtures such as those employing LEDs.

In embodiments, the regulated power supply 160 may include a local reserve power source 161 for providing momentary power to the microprocessor 162, the wireless transceiver 164, and various other components, as necessary, in the event that the regulated power supply 160 is not receiving power from the power source 104 or otherwise cannot supply power from the power source 104 to the remainder of the LCM 130. For example, if the power source 104 fails, or if a fuse in the regulated power supply 160 is blown, the local reserve power source 161 may allow the microprocessor 162 to store data (including the state of the processor, the state of the lamp assembly, and/or the cause of the failure) in non-volatile memory for later recovery, may allow the microprocessor 162 to place itself in a state that will facilitate reboot upon power recovery, and/or may allow the microprocessor 162 to cooperate with the wireless transceiver 164 to send a message to other lighting control modules, or to other devices, indicating that a failure has occurred and/or indicating the cause of the failure. The local reserve power source 161 may include a battery or a capacitor, for example.

The microprocessor 162, more generally described as a microprocessor sub-system, includes a computer processor or computing unit 163 and associated memory 165 (volatile and/or non-volatile), as well as associated circuitry 167 performing various interface functions between the computer processor and each of the regulated power supply 160, the wireless transceiver 164, the AC sense circuit 166, the dimming module 168, the relays 170 and 172, any programming interface(s), and any other components or sub-systems to which the microprocessor 162 is electrically and/or communicatively coupled. Generally, the microprocessor 162 and, specifically, the computer processor 163 is configured to perform functionality specific to the LCM 130, such as controlling the transceiver 164, transmitting and receiving data via the transceiver 164, performing lighting control functions, and the like. It should be understood that, throughout this specification, the references to the microprocessor 162 are, in most instances, references to the computer processor 163 that is programmed to perform the described functionality, and that the computer processor 163 cooperates in a predictable manner with the memory 165, from which the computer processor 163 retrieves data and instructions, and to which the computer processor 163 stores data.

Figure 5:
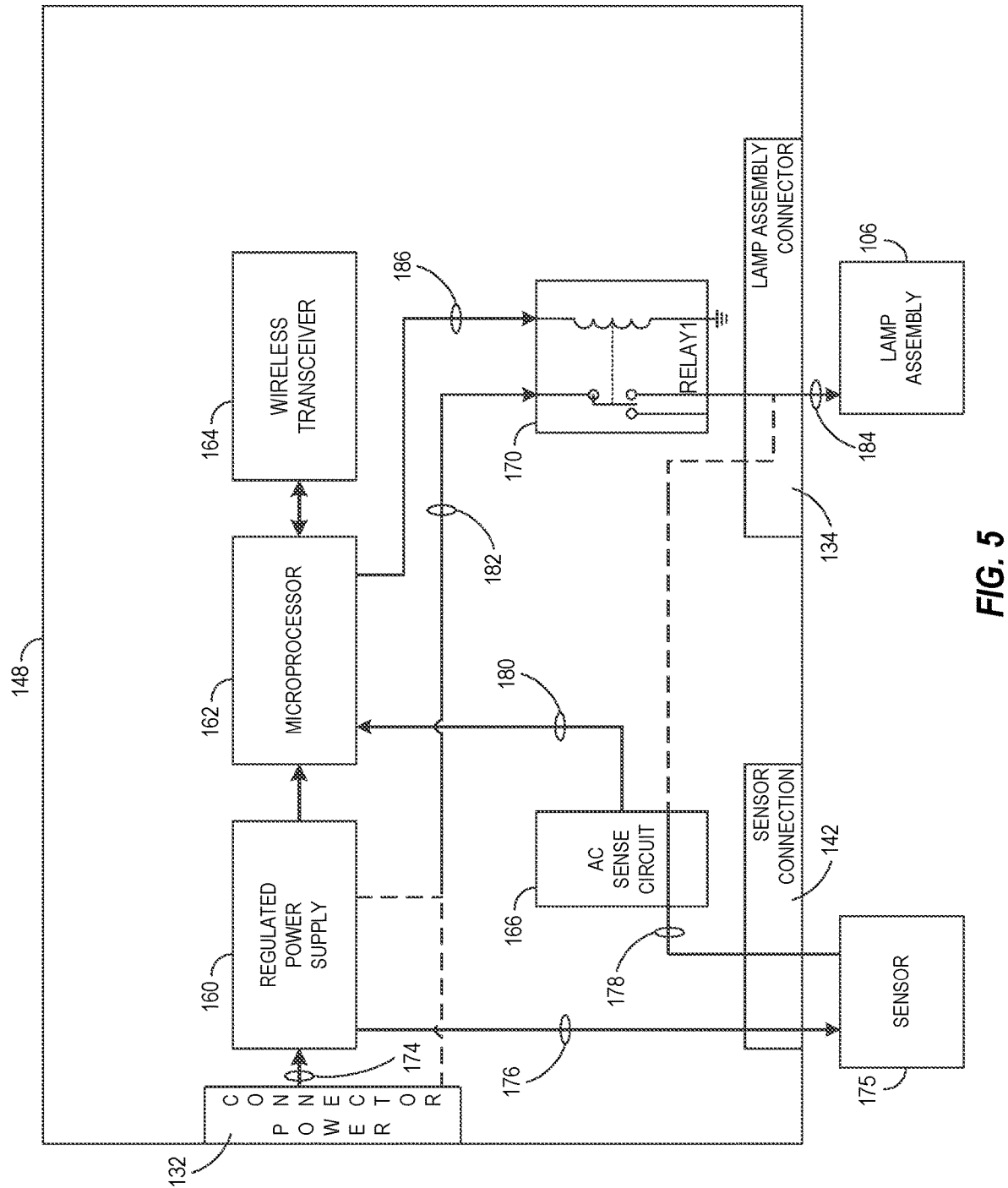
FIG. 5 illustrates the functional cooperation of a sub-set of the components depicted in FIG. 4.

For ease of understanding, the various sub-systems and functionality of the embodiment depicted in FIG. 4 will be described with reference to FIGS. 5-9. FIG. 5, for instance, depicts only particular components on the printed circuit board 148. While only particular components—the power connector 132, the regulated power supply 160, the microprocessor 162, the AC sense circuit 166, the relay 170, the sensor connection means 142, and the lamp assembly connector 134—are depicted in FIG. 5, it is not intended to indicate that other components are not present. Instead, each of FIGS. 5-9 is intended to highlight a particular mode or aspect of operation of the LCM 130.

FIG. 5 illustrates an embodiment in which the LCM 130 is coupled to a non-dimming motion sensor 175 via the sensor connection means 142. The regulated power supply 160 receives power from the power source 104 via an electrical connection 174 to the power connector 132. The regulated power supply 160 provides an AC voltage to the non-dimming sensor 175 via an electrical connection 176 through the sensor connection means 142. When the sensor 175 detects motion in the monitored space, the sensor 175 outputs, on an electrical connection 178, a signal indicative that it has detected motion in the monitored space. In particular, the sensor 175 outputs an AC voltage and, specifically, the same AC voltage that it receives from the regulated power supply 160. The signal on the electrical connection 178 may be provided directly to the lamp assembly 106 through the lamp assembly connector 134. In such configurations, the lamp assembly 106 would respond to the voltage on the connection 178. That is, the driver 108 would power the lamp 110, causing the lamp 110 to illuminate.

However, as will be appreciated, the full utility of the LCM 130 is best realized when the microprocessor 162 can react to the determination of the sensor 175 that motion has been detected in the monitored space. In order for the microprocessor 162 to react to that determination, though, the microprocessor 162 must receive a signal indicating that the sensor 175 has sensed the motion. Of course, generally speaking, the lamp assembly 106 requires voltages sufficiently high that passing to the microprocessor 162 the AC voltage output by the sensor 175 would damage the microprocessor 162. Accordingly, in the depicted embodiment, the connection 178 passes through the AC sense circuit 166 that, when AC voltages are present on the connection 178, sends a corresponding signal (e.g., a 3.3 V signal) to the microprocessor 162 on a connection 180. In a particular embodiment, the AC sense circuit 162 uses an opto-isolator circuit to sense the AC signal on the connection 178 and generate the corresponding signal on the connection 180. As will be understood, the opto-isolator may include, in an opaque package, an LED or lamp activated by the presence of the AC signal on the connection 178. In the same package, a photodiode, photoresistor, or other circuit responsive to the optical signal selectively passes a low voltage signal to the microprocessor 162 over the connection 180 according to the presence or absence of the optical signal (and, correspondingly, according to the presence or absence of AC voltage on the connection 178). In this manner, the microprocessor 162 may perform one or more actions according to the state of the sensor 175 and, more particularly, according to the state of the signal on the connection 180.

As described above, the voltage signal on the connection 178 may be provided directly to the lamp assembly 106 after passing through the AC sense circuit 166 (as indicated by the dashed portion of the connection 178). However, in alternate embodiments, the microprocessor 162, in response to the corresponding signal on the connection 180, may control the relay 170 to switch power on/off to the lamp assembly 106. Accordingly, a connection 182 may supply power to the relay 170, while the relay 170 selectively provides the power to the lamp assembly 106 via a connection 184 between the relay 170 and the lamp assembly 106 through the lamp assembly connector 134. The connection 182 supplying power to the relay 170 may originate directly from the power connector 132 in some embodiments while, in other embodiments, the connection 182 provides power to the relay 170 from the regulated power supply 160. (Alternative embodiments, as described with respect to the connection 182, being depicted in the drawings by dashed lines.) The state of the relay 170—that is, whether or not the relay 170 is passing power from the regulated power supply 160 to the lamp assembly 106—is controlled according to a signal from the microprocessor 162 on a connection 186 between the microprocessor 162 and the relay 170.

The term "connection" as used herein, refers to a physical, electrical connection for providing power and/or data connectivity between two elements. Such connections are typically contemplated as being traces on the printed circuit board 148, but may be effected by any electrical connection suitable for the purpose (electrical conductivity or data communication), including physical wires (e.g., between the power connector 132 and the relay 170), and may include any intermediary components, whether discrete components (such as capacitors) or integrated components (such as data transceivers). Additionally, where connections are depicted as bi-directional, it should be understood that a single depicted connection may be multiple physical connections, for example carrying data in different directions.

As will become apparent, the microprocessor 162 is configured to cooperate with the relay 170 to selectively provide power to the lamp assembly 106 regardless of whether the connection 178 also is wired to provide power directly to the lamp assembly 106 from the sensor 175. As such, the microprocessor 162 is capable of switching the relay 170 in response to signals other than the signal from the AC sense circuit 166 on the connection 180. Of course, the relay 170 (and the relay 172) has a low current circuit that controls a higher current circuit. The low current circuit is controlled by the microprocessor 162 using the connection 186, while the higher current circuit is controlled by the low current circuit and selectively provides the power signal from the connection 182 to the connection 184. The relay 170 (and the relay 172) may, in embodiments, have both normally-open and normally-closed outputs to which the connection 184 between the relay 170 and the lamp assembly 106 may be electrically coupled, according to the needs of the user.

Figure 6:
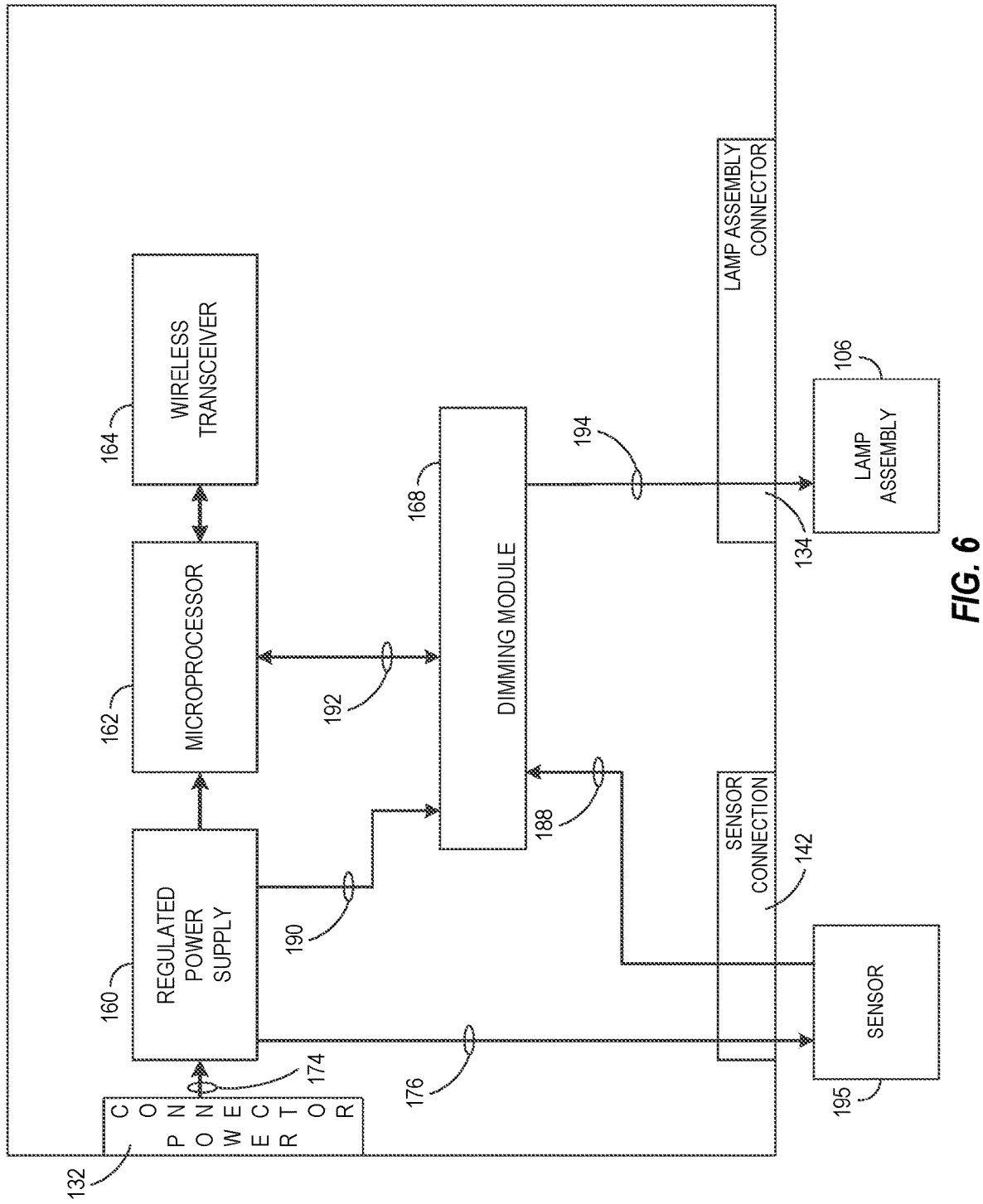
FIG. 6 illustrates the functional cooperation of a second sub-set of the components depicted in FIG. 4.

FIG. 6 illustrates an embodiment in which the LCM 130 is coupled to a dimming motion sensor 195 via the sensor connection means 142. The regulated power supply 160 receives power from the power source 104 via the electrical connection 174 to the power connector 132, just as in the embodiment depicted in FIG. 5. Also just as in the embodiment depicted in FIG. 5, the regulated power supply 160 provides an AC voltage to the dimming sensor 195 via the electrical connection 176 through the sensor connection means 142. When the sensor 195 detects motion in the monitored space, the sensor 195 outputs a signal intended to cause the lamp assembly 106 to change states to a lighting level corresponding to the signal (e.g., according to programming in the sensor 195). While, in the absence of the LCM 130, the signal output from the sensor 195 could be wired directly to the lamp assembly 106, in the embodiments depicted in FIG. 6, the signal is carried by a connection 188, through the sensor connection means 142, to the dimming module 168. While the signal on the connection 188 may be provided directly to the lamp assembly 106 (through the lamp assembly connector 134) in embodiments, it is contemplated that in some embodiments, the dimming module 168 will receive the signal from the sensor 195. The dimming module 168 regulates power to the lamp assembly 106 to moderate the level of illumination achieved by the lamp 110. Accordingly, the dimming module 168 may create a corresponding signal indicative of the signal from the sensor 195—for example, using an analog-to-digital converter— and may pass the corresponding signal from the dimming module 168 to the microprocessor 162 via a connection 192. The microprocessor 162 may, in turn, cause the dimming module 168 to output a signal to the lamp assembly 106 via a connection 194 through the lamp assembly connector 134, to cause the lamp assembly to illuminate the lamp 110. In various embodiments, the signal carried on the connection 194 from the dimming module 168 to the lamp assembly 106 may be identical to the signal received at the dimming module 168 on the connection 188; or may be related to (e.g., scaled), but not identical to, the signal received at the dimming module 168 on the connection 188, being determined by the microprocessor 162 according to the programming of the microprocessor 162; or may, in fact, be the signal received at the dimming module 168 on the connection 188.

However, as will be appreciated, the full utility of the LCM 130 is best realized when the microprocessor 162 can react to the determination of the sensor 195. Thus, while as described above, the voltage signal on the connection 188 may be provided directly to the lamp assembly 106 after passing through the dimming module 168, in alternate embodiments, the microprocessor 162, in response to the corresponding signal on the connection 188, may control the dimming module 168 to cause a change to the state of the lamp 110 in the lamp assembly 106 via a signal on the connection 194 that is not the same signal as the signal on the connection 188. The signal on the connection 194 may be the output of a digital-to-analog converter having on its input the signal from the microprocessor 162, for example.

In any event, the dimming module 168 may function, according to signals received from the microprocessor 162, to control and/or change the state of operation/illumination of the lamp 110 from (1) a deactivated state (i.e., not-illuminated/off) to an activated state (i.e., illuminated/on) (i.e., from 0% illumination to a >0% illumination), (2) an activated state to a deactivated state (i.e., from >0% illumination to 0% illumination), or (3) a first, lower activated state to a second, higher activated state (e.g., from 25% illumination to 50% illumination), or a first, higher activated state to a second, lower activated state (e.g., from 50% illumination to 25% illumination).

The microprocessor 162 may cause the dimming module 168 to output a signal on the connection 194 to control the lamp assembly 106 in a manner that differs from the manner in which the dimming sensor 195 is programmed to control the lamp assembly 106. For example, in one embodiment, in the absence of the LCM 130 the sensor 195 may be programmed to cause the lamp assembly 106 to illuminate at full intensity upon detection of motion in the monitored space, to cause the lamp assembly 106 to dim to half intensity upon expiration of a timer after no longer sensing motion in the monitored space, and to cause the lamp assembly 106 to turn off all illumination upon expiration of a second delay. With the LCM 130 in place, the sensor 195 may output the same signals on the connection 188 to the dimming module 168, but the microprocessor 162 may be programmed to, in response to the signals received from the sensor 195, cause the dimming module 168 to control the lamp assembly 106 in ways other than those programmed into the sensor 195. For instance, the microprocessor 162 could be programmed to cause the dimming module 168 to control the lamp assembly 106 in a first manner during a first time period (e.g., during business hours) and in a second manner during a second time period (e.g., during non-business hours). Accordingly, it should be understood that the dimming module 168 may be configured such that signals output by the dimming module 168 on the connection 194 may be controlled by the microprocessor 162, and may be variable across a range of voltages, as desired. Either way, the microprocessor 162 may be programmed to receive via the connection 192 the signals from the dimming module 168, and to cause the dimming module to control the lamp assembly 106 in a manner that differs from the manner in which the lamp assembly 106 would operate if operating directly from the signals from the sensor 195 on the connection 188.

The LCM 130 may be configured in different manners for different applications. For instance, in an embodiment, the dimming module 168 may be configured to provide on the connection 194 an output signal for driving a lamp assembly in which the lamp 110 includes LEDs (e.g., having a voltage ranging between 0 V and 5 V, or between 0 V and 10 V), while in other embodiments, the dimming module 168 may be configured to provide on the connection 194 an output signal for driving a lamp assembly in which the lamp 110 includes fluorescent lamps (e.g., a voltage ranging between 80 V and 120 V). In some embodiments, the dimming module 168 may be configured with multiple outputs, each associated with a different range of voltages and/or power capacities, such that a single dimming module 168 could be used with multiple types of lamp assemblies by selecting the output coupled to the connection 194 between the dimming module 168 and the lamp assembly 106 (or, alternatively, by providing multiple connections between the dimming module 168 and the lamp assembly connector 134, from which the end user may select to connect to the lamp assembly 106).

Of course, the dimming module 168 may be used even when the LCM 130 is coupled to a non-dimming sensor (e.g., the sensor 175). In such instances, the non-dimming sensor 175 may send an AC signal to the AC sense circuit 166 on the connection 178, and the AC sense circuit 166 may generate a corresponding signal to the microprocessor 162 on the connection 180. Logic executing in the microprocessor 162 may cause the microprocessor 162 to send a signal to the dimming module 168 to cause the dimming module 168 to change the state of the lamp 110 in the lamp assembly 106. For instance, the logic executing in the microprocessor 162 may cause the dimming module 168 to set the brightness of the lamp assembly 106 to 50% when the non-dimming sensor 175 detects motion in the monitored area during some periods of the day, but may cause the dimming module 168 to set the brightness of the lamp assembly 106 to 100% when the non-dimming sensor 175 detects motion in the monitored area during other periods of the day. In this manner, the LCM 130 may providing dimming control of the lamp assembly 106, even while coupled to a non-dimming sensor (e.g., the sensor 175), essentially adding dimming to an otherwise non-dimming configuration.

Referring to FIGS. 4 through 6, each figure depicts the wireless transceiver 164 communicatively coupled to the microprocessor 162. Among other things, the wireless transceiver 164 facilitates wireless communication between the LCM 130 and one or more other lighting control modules in the lighting system. Communication between the LCM 130 and other lighting control modules may take the form of status and/or command messages broadcast to the LCM 130 or sent by the LCM 130 to specific other lighting control modules, received by the LCM 130 from one or more other lighting control modules, or both. The other lighting control modules (e.g., lighting control modules receiving status or command information from the LCM 130) may include respective sensors or may operate without local sensors, responding only to commands and status information received from the LCM 130. A variety of embodiments implementing wireless communication between a multiplicity of lighting control modules will be described with reference to FIGS. 4 through 6, and to FIGS. 7A through 7C.

Figure 7A:
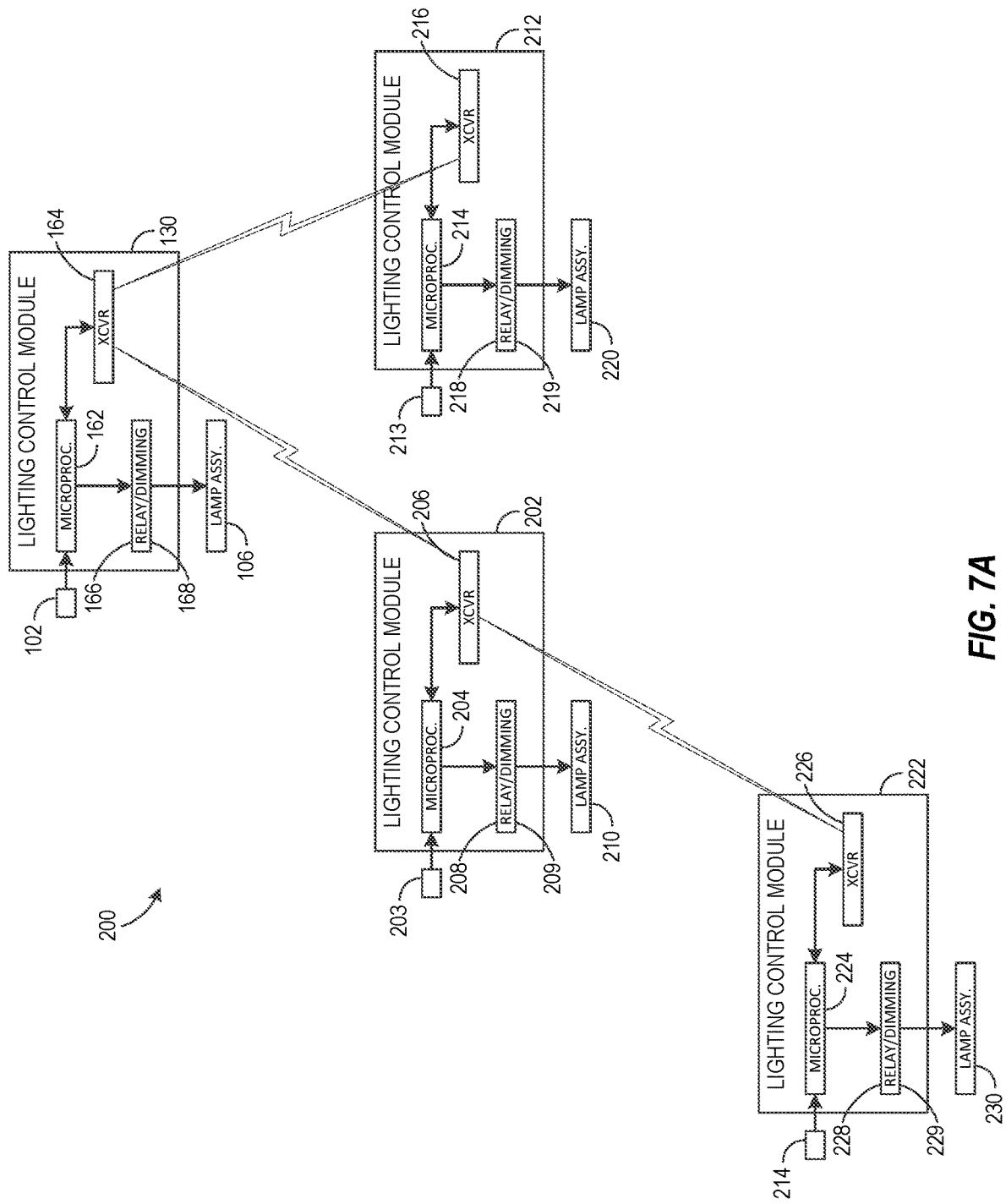
FIG. 7A depicts a first example embodiment of a system of lighting control modules and associated lamp assemblies.

FIG. 7A depicts a system 200 of lighting control modules and associated lamp assemblies. In addition to the LCM 130, the system 200 includes LCMs 202, 212, and 222, each having respective sensors (203, 213, 223), microprocessors (204, 214, 224), wireless transceivers (206, 216, 226), relays (208, 218, 228), dimming modules (209, 219, 229), and each coupled to respective lamp assemblies (210, 220, 230). The sensors 102, 203, 213, 223 depicted in FIG. 7A are generic sensors that may be either dimming or non-dimming for the purposes of the examples that follow. It is noted that while the sensors 102, 203, 213, 223 are each depicted as communicatively coupled to respective microprocessors 162, 204, 214, 224, such connection may be indirect (as described above with respect to the LCM 130), despite being illustrated for ease of representation in FIG. 7A as direct. Additionally, as described above, not every lighting control module may necessarily be coupled to a sensor.

As described above, the microprocessor 162 receives data (e.g., state information) related to the state of the locally attached lamp assembly 106, controls the locally attached lamp assembly 106 and therefore has data (e.g., state information) regarding the state of the lamp assembly 106, and/or, at least, receives data (e.g., sensor data) related to the state of the locally attached sensor 175 or 195. The microprocessor 162 may respond to such data by, for example, causing the wireless transceiver 164 to transmit data such as commands, sensor data, and/or state information of the lamp assembly 106 to one or more other lighting control modules (e.g., the LCMs 202, 212, 222). The data may be received by a corresponding transceiver (206, 216, 226) on each of the one or more other lighting control modules, and communicated from the wireless transceiver on the lighting control module to a corresponding microprocessor (208, 218, 228) on that lighting control module, which may respond to the received data by, for instance, causing a lamp assembly (210, 220, 230) associated with the lighting control module to change state.

Conversely, the wireless transceiver 164 may receive from another lighting control module data such as state information, commands, and/or sensor data. The received data may be communicated to the microprocessor 162 and, in turn, the microprocessor 162 may take one or more programmed actions in response to the received data. The programmed actions may include, for instance, changing a state of the lamp assembly 106 (e.g., on to off, off to on, changing the brightness, etc.) or causing the wireless transceiver 164 to send one or more messages to one or more other lighting control modules.

The microprocessor 162 may cause the wireless transceiver 164 to transmit any type of data to the one or more other lighting control modules. In some embodiments, the microprocessor 162 causes the wireless transceiver 164 to transmit sensor data, such as the state of the sensor 102 output. For example, when the sensor 102 is a non-dimming sensor (e.g., the sensor 175) and senses motion in the monitored area, the microprocessor 162, having received (via the connection 180) a signal indicating the presence of an AC voltage on the connection 178, may cause the wireless transceiver 164 to transmit data indicating that the sensor 102 has detected motion. The wireless transceiver 206 of the LCM 202 may receive the signal transmitted by the wireless transceiver 164, and may communicate the received signal to the microprocessor 204 of the lighting control module 202. The microprocessor 204 may be programmed to respond to the received indication that the sensor 102 detected motion by changing a state of a lamp assembly 210.

In another example, when the sensor 102 is a dimming sensor (e.g., the sensor 195) and senses motion in the monitored area, the microprocessor 162, having received (via the connection 188) a signal indicating that the sensor 102 has detected motion, may cause the wireless transceiver 164 to transmit data indicating that the sensor 102 has detected motion and, like the example above, may cause the wireless transceiver 164 to transmit data indicating that the sensor 102 has detected motion. The wireless transceiver 206 and microprocessor 204 may respond in much the same way as described above. However, in an alternate embodiment, the microprocessor 162 may cause the wireless transceiver 164 to transmit an output level, rather than merely an indication that the sensor 102 detected motion. In that case, the transceiver 206 of the LCM 202 may receive the signal from the wireless transceiver 164, and communicate the contents of the signal to the microprocessor 204. The microprocessor 204 may be programmed to adjust the output level of the lamp assembly 210 according to signal received from the LCM 130.

In yet another example, the microprocessor 164 may be programmed to cause the wireless transceiver 164 to transmit commands to other LCMs, rather than sending merely information. That is, rather than sending information (e.g., sensor data or lamp assembly state data) to other LCMs and allowing the respective microprocessors to react to the sent information according to the respective programming of the microprocessors, the LCM 130 (i.e., the microprocessor 162) may determine what actions should be implemented by the other LCMs and may send commands to those LCMs. The commands may override the current state of the lamp assemblies coupled to the LCMs, or the respective microprocessors may determine whether or not to override the present state of the corresponding lamp assembly in response to received commands.

As should be apparent at this point, the signal transmitted by any one of the wireless transceivers 164, 206, 216, 226 may include data indicating one or more target devices (i.e., a specific one or more of the other LCMs) and, correspondingly, each LCM may be assigned a unique identification and/or a non-unique identification (e.g., a zone). Any signal transmitted by one of the wireless transceivers 164, 206, 216, 226 may therefore be directed a specific one of the other wireless transceivers 164, 206, 216, 226, or may be directed to multiple ones of the other wireless transceivers 164, 206, 216, 226, or may be broadcast to all other wireless transceivers 164, 206, 216, 226 in the system 200, or may be directed to an enumerated subset of the wireless transceivers (e.g., all transceivers in a specific zone). Moreover, the LCMs 130, 202, 212, 222 may form a mesh network in which a transmission from any one of the LCMs may reach any of the other LCMs via 0 or more re-transmissions by intermediary LCMs. With reference to FIG. 7A, for example, the LCM 130 may send a transmission to the LCM 222 via a re-transmission of the information by the LCM 202.

Without limitation, a given transmission from any LCM may include any of the following: a zone identifier of a target LCM, a unique module identifier of a target LCM, a zone identifier of the transmitting LCM, a unique module identifier of the transmitting LCM, an on/off status of a lamp connected to the LCM, a brightness setting of a lamp connected to the LCM, a command to change a lamp status to on, a command to change a lamp status to off, a command to set a lamp brightness, one or more time delay values, health information about the lamp, the lamp assembly, and/or the TVSS circuitry 158, supply voltages, fixture temperature, humidity, and/or data from (or data derived from) a device coupled to the auxiliary board 150.

Also without limitation, a microprocessor associated with an LCM receiving a message ("receiving LCM") may, in response to a message received by a corresponding wireless transceiver, perform any of the following: compare a zone identifier of a target LCM specified in the message with the zone identifier of the receiving LCM; compare a unique module identifier of a target LCM specified in the message with the unique module identifier of the receiving LCM; compare a zone identifier of the transmitting LCM with the zone identifier of the receiving LCM; change the state of the associated lamp assembly to on; change the state of the associated lamp assembly to off; set a brightness of an associated lamp assembly; cause the wireless transceiver of the receiving LCM to retransmit the message to an LCM other than the transmitting LCM; cause the wireless transceiver of the receiving LCM to transmit a different message to an LCM other than the transmitting LCM; cause the wireless transceiver of the receiving LCM to acknowledge to the transmitting LCM the message received by the receiving LCM.

Figure 7B:
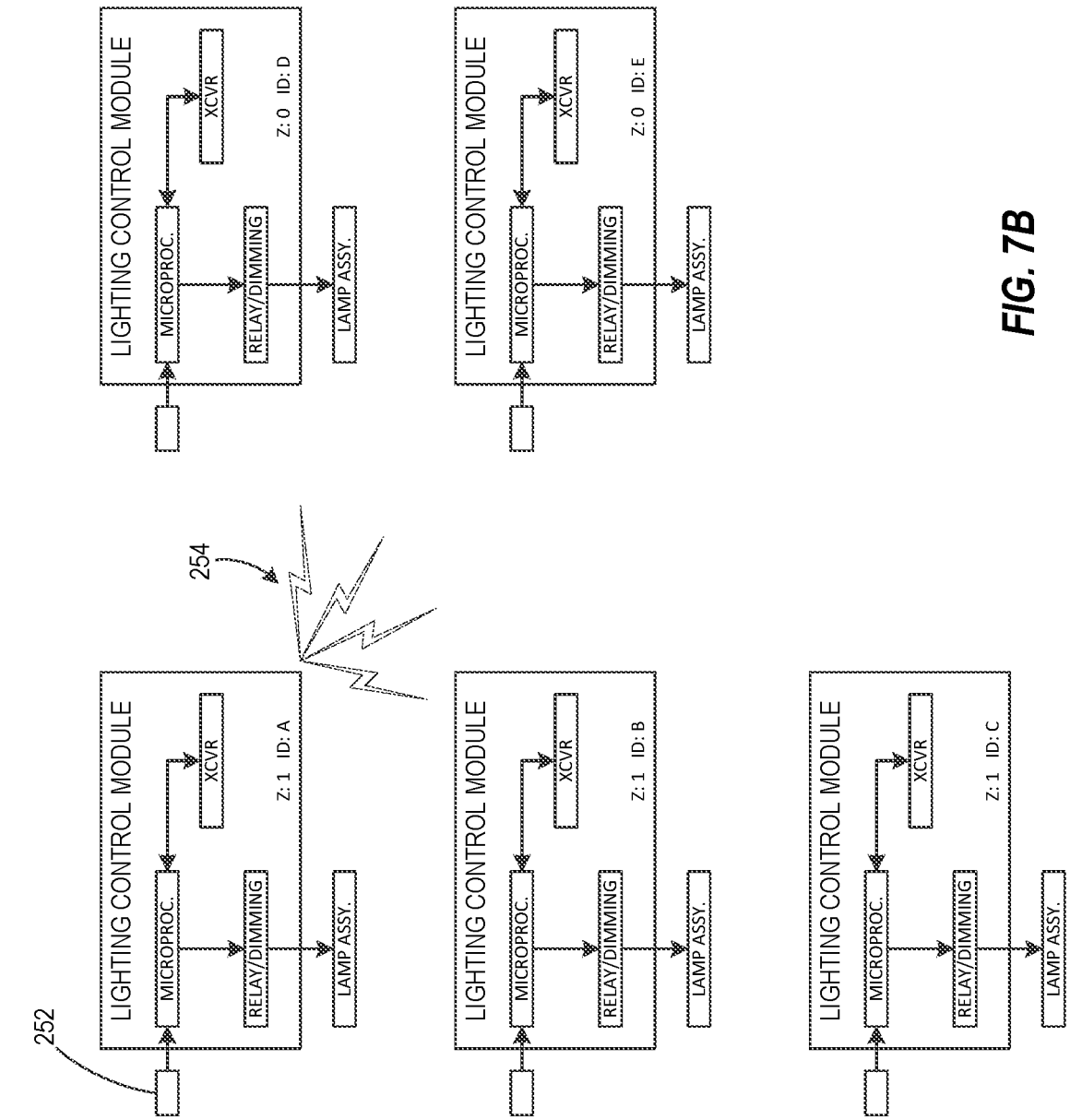
FIG. 7B depicts a second example embodiment of a system of lighting control modules and associated lamp assemblies.

FIG. 7B depicts an exemplary system 250 having five LCMs in two enumerated zones: zone 0 and zone 1. Zone 1 includes three LCMs, each having a unique identifier A, B, or C. Zone 2 includes two LCMs, each having a unique identifier D or E. In an example, a sensor 252 associated with the LCM having unique identifier A ("LCM:A") detects motion in the monitored area (e.g., a conference room). The microprocessor in LCM:A causes lamp assembly associated with LCM:A to illuminate, and also causes the wireless transceiver of LCM:A to transmit a broadcast message via a wireless signal 254. The message includes a zone identifier (zone 1) and a command to turn associated lamp assemblies to the "on" state. Each of the other LCMs may receive the broadcast message and compare the zone identifier with its own zone identifier. LCMs having the same zone identifier as that specified in the broadcast message may be programmed to execute the received command and, accordingly, may cause their associated lamp assemblies to go to the "on" state. As a result of the transmission from LCM:A, LCMs having unique identifiers B and C would also illuminate. LCMs having unique identifiers D and E would not illuminate because, upon receiving the broadcast message, each would determine that its own zone identifier differed from the zone identifier specified in the message and, accordingly, would ignore the broadcast message.

Figure 7C:
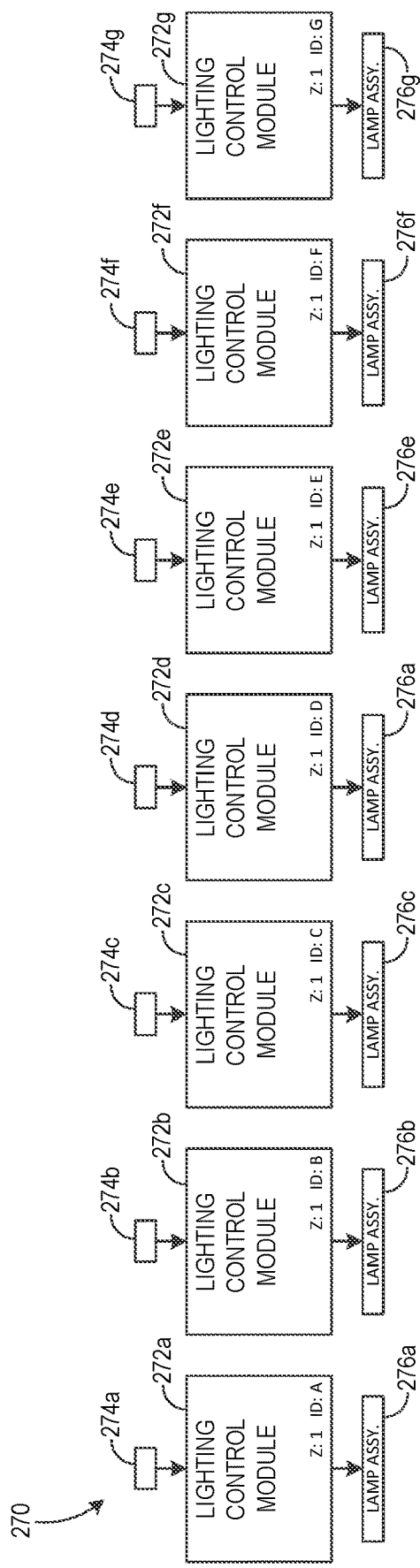
FIG. 7C depicts a third example embodiment of a system of lighting control modules and associated lamp assemblies.

An exemplary system 270 is depicted in FIG. 7C. The exemplary system 270 includes seven LCMs 272A-272G in only a single zone (zone 1), such as may be the case when each of the LCMs 272A-272G is in an aisle of a warehouse. Each of the LCMs 272A-272G includes an associated sensor 274A-274G and an associated lamp assembly 276A-276G. In an embodiment, each LCM 272A-272G is programmed (i.e., the microprocessor associated with each LCM 272A-272G is programmed) to turn the associated lamp assembly 276A-276G to the "on" (i.e., fully illuminated) state when the corresponding sensor 274A-274G associated with the LCM 272A-272G detects motion. In such an embodiment, each lamp assembly 276A-276G would illuminate only as the corresponding sensor 274A-274G detected motion.

In an alternate embodiment, each LCM 272A-272G is programmed (i.e., the microprocessor associated each LCM 272A-272G is programmed) to change the associated lamp assembly 276A-276G to the "on" state when the corresponding sensor 274A-274G associated with the LCM 272A-272G detects motion, but is also programmed to cause the associated wireless transceiver to transmit a message. The message transmitted by any one of the LCMs 272A-272G may include the unique module identifiers of the two adjacent LCMs, as well as a command to adjust the brightness of each to 50% (or any other brightness setting). Further, each may be programmed to send a second message, including the remaining unique module identifiers and a command to set the state of the associated lamp assembly to the "off" (non-illuminated) state, or to send no other messages to the remaining unique module identifiers. Thus, as a person enters the aisle, the sensor 274A may detect motion and the LCM 272A may cause the lamp assembly 276A to illuminate, while at the same time sending a message to the LCM 272B to cause the lamp assembly 276B to be set to 50% brightness and sending a message to the LCMs 272C-272G to set the state of the corresponding lamp assemblies 276C-276G to "off." As the person continues down the aisle, the sensor 274B associated with the LCM 272B would detect motion. Accordingly, the LCM 272B may cause the lamp assembly 276B to fully illuminate, while at the same time sending a message to the LCM 272A and the LCM 272C to cause the associated lamp assemblies 276A and 276C to be set to 50% brightness, and sending a message to the LCMs 272D-272G to set the state of the corresponding lamp assemblies 276C-276G to "off." As the person continues still further down the aisle, the sensor 274C associated with the LCM 272C would detect motion. Accordingly, the LCM 272C may cause the lamp assembly 276C to fully illuminate, while at the same time sending a message to the LCM 272B and the LCM 272D to cause the associated lamp assemblies 276B and 276D to be set to 50% brightness, and sending a message to the LCMs 272A and 272E-272G to set the state of the corresponding lamp assemblies 276C-276G to "off." In such an embodiment, an "envelope" of light would follow the person down the aisle, conserving energy, but providing adequate light for the person in the aisle. Of course, rather than sending "off" messages to lamp assemblies, each LCM could receive a timer value and return the associated lamp assemblies to the "off" state after the timer delay has elapsed from the time the illuminate command was received.

Of course, other programming could result in other lighting effects. As but one example, upon detecting motion on any of the sensors 274A-274G, the associated LCM 272A-272G could cause the associated wireless transceiver to send a message including the zone identifier (zone 1) and a command to set the brightness to 50% (i.e., all of the lamp assemblies 276A-276G would be set to 50% brightness). These examples being non-limiting, one can imagine any variety of programming schemes taking advantage of the capabilities of the LCMs disclosed in this specification and, in particular, taking advantage of the wireless transceivers therein.

The transceivers may operate in any of a variety of radio frequency bands, including, without limitation, 915 MHz, 2.4 GHz, 5 GHz, and the like. Additionally, while any number of communication protocols, standardized or proprietary, may be employed, it is explicitly contemplated that in embodiments, the communication protocol employed for communicating between the LCMs include a call and response arrangement in which every transmission is acknowledged by each LCM specified in the transmitted message, and/or wherein some transmission loss mitigation method (including, for example, retransmission) is implemented. It is further contemplated that the contents of the messages transmitted between the LCMs be encrypted to secure the network from external and/or malicious interference.

Figure 8:
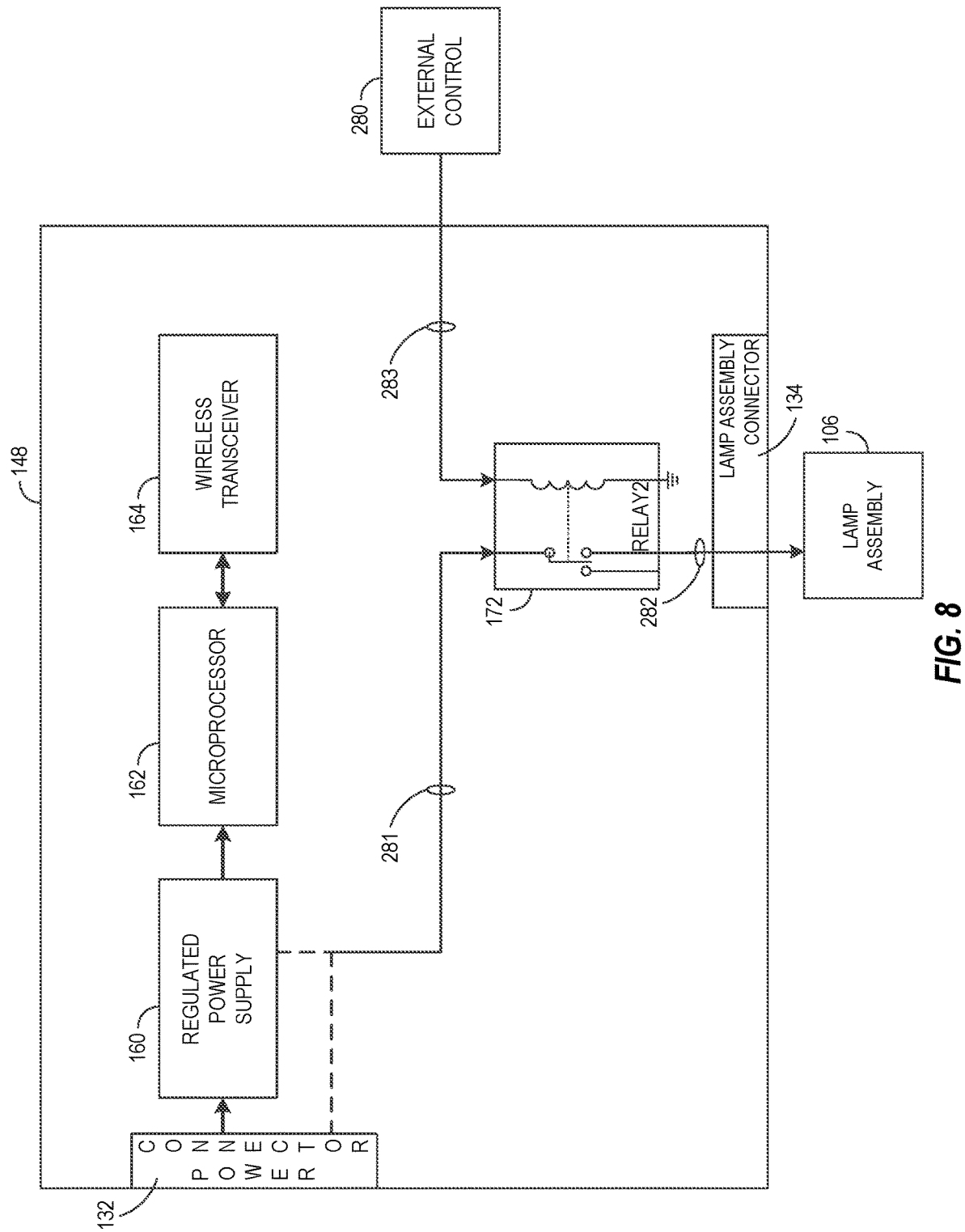
FIG. 8 illustrates the functional cooperation of yet another sub-set of the components depicted in FIG. 4.

FIG. 8 depicts a simplified block diagram of the circuit board 148 to describe additional functionality that may be implemented, in embodiments. That is, while only certain components are illustrated in FIG. 8, it should be understood that the components illustrated are a sub-set of the components actually present on the circuit board (e.g., as depicted in FIG. 4) and that the simplified diagram is presented for ease of explanation. As described above with reference to FIG. 4, the circuit board 148 includes the relay 172. The relay 172, like the relay 170, may be electrically coupled (e.g., via an electrical connection 282 from the switched secondary (higher current) contact of the relay 172) to the lamp assembly 106. In contrast to the relay 170, which is controlled by the microprocessor 162, the relay 172 may be controlled by an external device 280. As a result, it becomes possible to configure the LCM 130 such that the state of the lamp assembly 106 may be controlled by an entity other than the sensor 102 or the microprocessor 162. As an example, it may be advantageous, in embodiments, to have the relay 172 electrically coupled (e.g., by a connection 283 to a primary (low current) contact of the relay 172) to a switch (i.e., the external control 280) that controls the state of the relay 172, such that the lamp assembly 106 may be switched to the "on" (i.e., illuminated) state even if no motion is detected by the sensor 102 and even if no signal is received at the wireless transceiver 164, and no logic executed in the microprocessor 162 that would otherwise cause the microprocessor 162 to activate the relay 170. For instance, the relays 172 of a group of lighting control modules, including the LCM 130, could be electrically coupled to a single external control 280 (e.g., an emergency button) that, upon activation, would cause the respective lamp assemblies of each of the lighting control modules to illuminate.

While the external control 280 may be electrically connected to the relay 172 (i.e., to the primary, low-current coil) according to any of a variety of methods, in embodiments, the primary of the relay 172 may be coupled to the circuit board 148, which, in turn, may carry the electrical signal to an edge of the circuit board 148. An electrical connection (e.g., a ribbon cable, or other connector) may carry the electrical connection from the circuit board 148 to a port (not shown in FIG. 8) on the housing 140. Exemplary ports may include a screw terminal (as depicted at 284 in FIGS. 12A and 12B), a modular connector, or even an ⅛-inch stereo jack. Any port may be used, so long as it facilitates electrical connection between the external device 280 and the primary contacts of the relay 172.

Power to the non-switched, secondary contact of the relay 172 may be provided from the regulated power supply 160 via an electrical connection 281 between the regulated power supply 160 and the relay 172 or, as described above, between the power connector 132 and the relay 172. Generally, if the relay 172 is being employed to selectively power the lamp assembly 106, the voltage on the connection 281 will be the same as the voltage on the connection 182 (see FIG. 5) or the connection 190 (see FIG. 6), though in embodiments the voltage on the connection 281 may differ in order to achieve a different lighting characteristic (e.g., dimmer illumination). Of course, the relay 172 may also be employed to selectively power a second driver/lamp of the lamp assembly 106.

Figure 9:
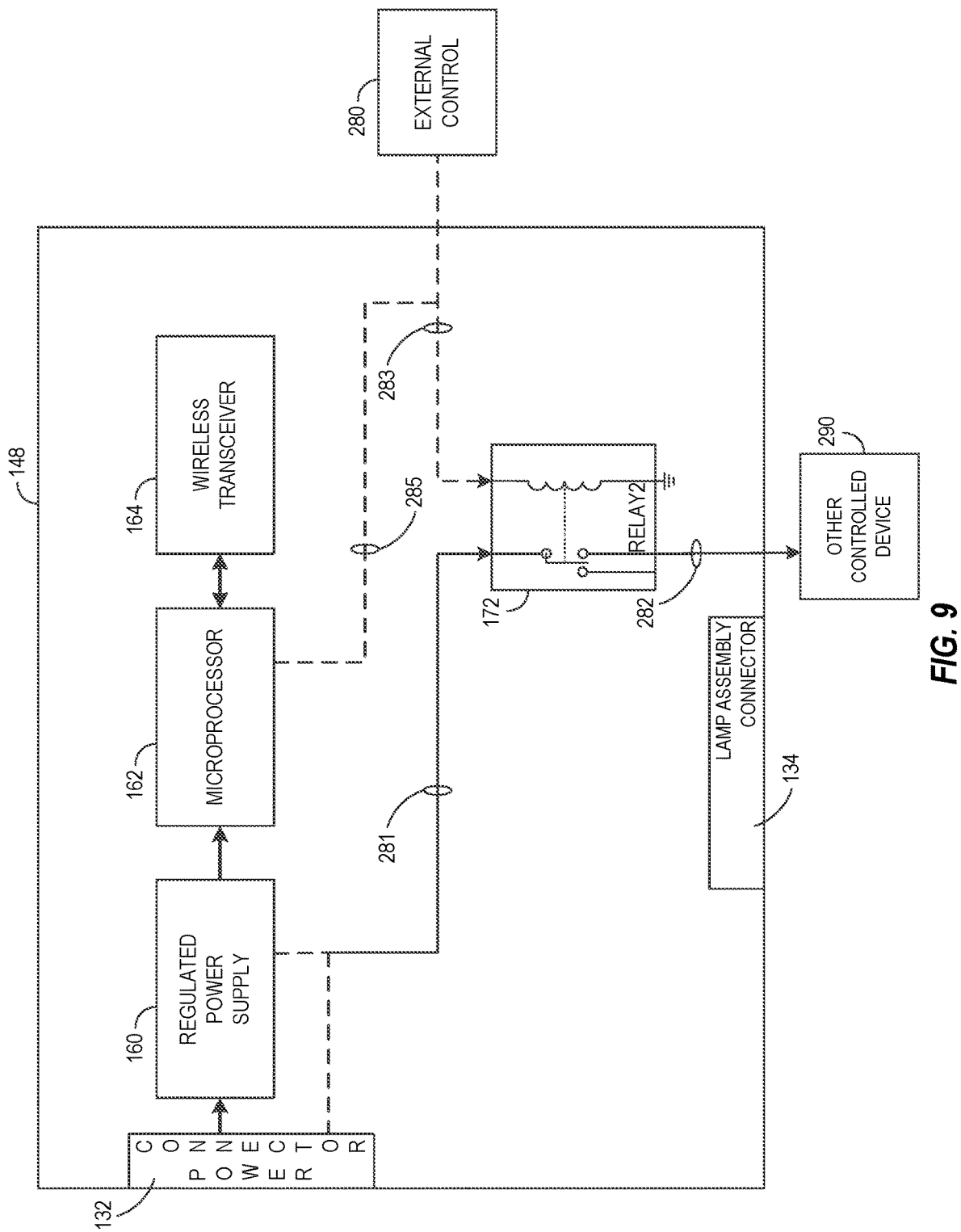
FIG. 9 illustrates a second embodiment of the functional cooperation of the sub-set of components depicted in FIG. 8.

The relay 172 may also be employed to control devices other than the lamp assembly 106, as depicted in FIG. 9. In FIG. 9, the secondary (i.e., controlled) connection of the relay 172, rather than being electrically coupled to the lamp assembly 106, is connected to another controlled device 290. The controlled device 290 may be any device that the user desires to control, but in some embodiments constitutes a night-time lighting system (e.g., a low voltage and/or low-illumination lamp for providing a minimum amount of light). In other embodiments, the controlled device 290 may be a signal lamp configured to garner attention by blinking, strobing, or having an attention-grabbing color (e.g., red). In still other embodiments, the controlled device 290 may not be a lamp at all, but may instead be a non-illuminating device such as a fan. In any event, the relay 172 may selectively provide power to the controlled device 290. The non-switched secondary contact of the relay 172 may be electrically coupled to the regulated power supply 160 (e.g., via the connection 281 described with respect to FIG. 8), and may receive from the regulated power supply 160 a regulated voltage. The regulated voltage may be any voltage for which the regulated power supply 160 is configured to provide an output, including, without limitation, 3.3 V, 5 V, 12 V, 24 V, 120 V, 240 V, 277 V. In embodiments, the regulated power supply 160 includes a control (e.g., DIP switches) for adjusting the voltage provided to the non-switched secondary contact of the relay 172, so that the voltage delivered to the controlled device 290 is adjustable depending on the requirements of the controlled device 290.

The primary, controlled input to the relay 172 may be coupled to an external control 280 (e.g., the connection 283, as described with respect to FIG. 8), or may be electrically coupled to, and controlled by, the microprocessor 162, via a connection 285 from the microprocessor 162 to the primary contact of the relay 172. In embodiments in which the microprocessor 162 controls the relay 172, the microprocessor 162 may execute any desired logic to control the relay 172 and, consequently, the on/off state of the controlled device 290. By way of example, the controlled device 290 may be a red lamp designed to attract attention in the event of a malfunction. As another example, the microprocessor 162 may execute logic to determine, for example, that motion is detected during a period where no one would be expected to be in the monitored area. That is, the microprocessor 162 may execute logic to activate the relay 172 when motion is detected between certain times (e.g., to help guide security to the area in which the motion was detected). As will become apparent in view of the description below, the microprocessor 162 may also receive inputs from other devices and, accordingly, may execute logic based on those inputs to control the relay 172 and, in turn, the controlled device 290.

Figure 10A:
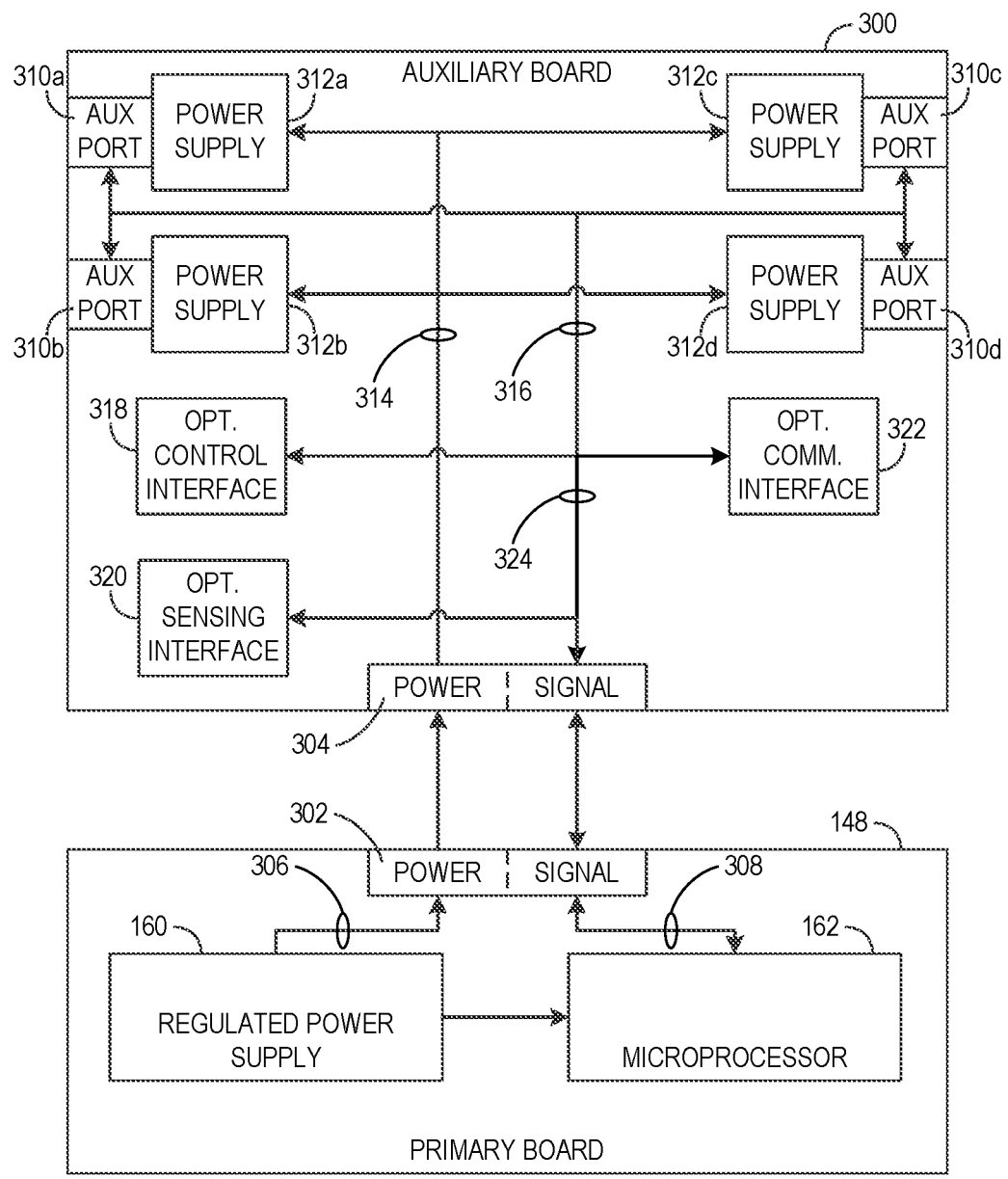
FIG. 10A is a block diagram depicting a lighting control module having an associated auxiliary module.

Another feature of the LCM 130, in some embodiments, is a connector on the circuit board 148 for electrically and/or communicatively coupling an auxiliary board to the LCM 130. FIG. 10A is a block diagram depicting the connection of an auxiliary module 300 to the circuit board 148 of the LCM 130. The circuit board 148 includes a connector (or multiple connectors) 302 for coupling the auxiliary module 300 to the circuit board via a corresponding connector (or multiple connectors) 304 on the auxiliary module 300. The connector 302 may be electrically coupled via one or more connectors 306 to the regulated power supply 160. In selected embodiments. Correspondingly, each of the connectors 302 and 304 may have one or more connections for providing power from the regulated power supply 160 to the auxiliary module 300. In some embodiments, the auxiliary module 300 may include functionality that requires communication of data to and/or from the microprocessor 162. Accordingly, each of the connectors 302 and 304 may include connections for communicating data from the auxiliary module 300 to the circuit board 148. The circuit board 148 may have corresponding connections 308 communicatively coupling the connector 302 to the microprocessor 162. As should be understood, where bidirectional communications between the auxiliary module 300 and the microprocessor 162 are contemplated, there may be multiple connections 308 carrying data between the microprocessor 162 and the auxiliary module 300, with some of the connections 308 carrying data in one direction, and other connections 308 carrying data in the other direction. In embodiments, the connectors 302 and 304 may implement a powered USB connection, and the connectors 302 and 304 may be USB connectors.

Generally speaking, the auxiliary module 300 provides one or more auxiliary ports 310 for providing power to auxiliary devices (not shown), thus increasing the utility of the LCM 130. The auxiliary devices may include, by way of example and not limitation, video cameras, additional sensors (e.g., temperature sensors, air quality sensors, smoke detectors, ambient light sensors, acoustic sensors, etc.), additional lights, data acquisition modules, cellular transceivers and other wireless access points, and the like. While FIG. 10A depicts four auxiliary ports 310a-d, in various embodiments, the auxiliary module 300 may have more or fewer auxiliary ports. In embodiments, each of the auxiliary ports 310a-d is a Universal Serial Bus (USB) port configured to provide low-voltage power to a connected external device. However, there is no requirement that the auxiliary ports 310a-d be USB ports and, in fact, no requirement that the auxiliary ports 310a-d be all of one particular type or configuration (e.g., the ports 310a-d may provide different voltages, may be different non-USB types of ports, etc.). The auxiliary ports 310a-d may extend from the auxiliary module 300, or otherwise be accessible from the outside of the LCM 130 via corresponding openings 311 (see FIGS. 12A and 12B) in the housing 140 aligned with the auxiliary ports 310a-d.

As shown in FIG. 10A, each of the auxiliary ports 310a-d is electrically coupled to a corresponding power supply 312a-d, which may be an isolated power supply or a non-isolated power supply. Each of the power supplies 312a-d is electrically coupled, by one or more electrical connections 314, to the connector 304 and, when the connector 304 is electrically coupled to the connector 302, each of the power supplies 312a-d is electrically coupled to the regulated power supply 160. In an embodiment, each of the power supplies 310a-d receives a 5 V signal from the regulated power supply 160 when the auxiliary module 300 is coupled to the circuit board 148. In other embodiments, the voltage signals supplied to the auxiliary module 300 may be higher or lower voltage than 5 V and, in fact, different voltage signals may be supplied to different ones of power supplies 312a-d. As should be understood, the voltages received by the power supplies 312a-d may be modified by the respective power supplies 312a-d such that the power supplied to external devices through the auxiliary ports 310a-d are higher or lower than the voltages received by the power supplies 312a-d (e.g., the power supply 312a may receive a 10 V signal from the regulated power supply 160, but provide a 5 V signal from the auxiliary port 310a). Additionally, each of the power supplies 312a-d may supply power at 5 V, 10 V, 12 V, 24 V, or any other desired voltage. In embodiments, the particular voltage supplied by a specific one of the power supplies 312a-d is selectable by the user via a switch or via programming of the microprocessor 162. In embodiments the particular voltage supplied by a group of the power supplies 312a-d is selectable by the user via a switch or via programming of the microprocessor 162. In other embodiments, the voltage supplied by the power supplies 312a-d is not selectable (i.e., is fixed).

One or more of the auxiliary ports 310a-d may also be communicatively coupled to the microprocessor 162, such that the microprocessor 162 may execute logic according to data received from the device(s) connected to the auxiliary ports 310a-d and/or control and/or send data to the device(s) connected to the auxiliary ports 310a-d. Accordingly, one or more (or all) of the auxiliary ports 310a-d may be communicatively coupled to the connector 304 via respective connections 316. Of course, while the connections 316 are depicted in FIG. 10A as a single line, the connections 316 will, in most embodiments include at least two electrical connections (one for receive and one for transmit) and, accordingly, the connector 304 would potentially have as many communication connections 316 as twice the number of auxiliary ports 310a-d.

The auxiliary module 300 may also include additional control interfaces 318, sensing interfaces 320, and/or communication interfaces 322. The additional interfaces may be built into the auxiliary module 300 in some embodiments while, in others, a user may be able to add the additional interfaces at a later time. In the latter embodiments, the auxiliary module 300 may include a high speed communication bus 324 (which may be part of or different from the communication connections 316. The communication bus 324 may be, by way of example only, a peripheral communication interface (PCI) bus, or any other type of known or later developed communication bus, and the additional interfaces may be added by, for example, plugging card-edge connectors into card-edge slots on the auxiliary module 300.

While any number of embodiments may exist implementing the additional interfaces, exemplary additional interfaces include: an optional control interface 318 facilitating control of an additional lamp assembly 106; an optional control interface 318 facilitating control of an additional non-lamp assembly device; an optional control interface 318 adding an additional relay to control an additional device; an optional sensing interface 320 facilitating use of one or more additional sensors in combination with the sensor 102, which additional sensor(s) may be configured to detect motion or to detect something other than motion; an optional sensing interface 320 facilitating use of a new sensor not compatible with the primary board 148; an optional communication interface 322 configured to communicate on a different frequency than the wireless transceiver 164; an optional communication interface 322 configured to communicate using a different protocol than the wireless transceiver 164; etc.

In embodiments, the optional communication interface 322 may be a communication interface or device that is communicatively coupled to the Internet via any wireless protocol including, but not limited to, WiFi (i.e., any IEEE 802.11 protocol), cellular telephony (e.g., 3G, 4G/LTE, 5G services), etc. The optional communication interface 322, when connected to the Internet may, for example, facilitate a secure connection for receiving firmware updates, facilitate the receipt of astronomical clock details (e.g., local sunrise/sunset times), and/or facilitate zone-based updates, any of which may be accomplished for any fixture in the zone by receiving an update and forwarding the update to other LCMs 130 via the respective wireless transceivers 164 in the event that only one LCM 130 in the system has the optional communication interface 322. The optional communication interface 322, when connected to the Internet, can also facilitate implementation of demand response functionality, allowing the LCMs 130 to respond to electricity demand events (e.g., signals received from the electricity provider) by adjusting one or more of the fixtures to decrease electricity consumption by turning some of the fixtures off, dimming one or more of the fixtures, etc.

The optional communication interface 322 may also or alternatively, in embodiments, be configured to facilitate setting a time-of-day using a received signal. The received signal may be received from any time server that maintains and transmits a signal indicating the present time and, in particular, may be received from the National Institute for Standards and Technology (NIST) via the Internet (e.g., from a NIST time server) using Network Time Protocol (NTP) or any other known protocol. Alternatively, the received signal may be received via a signal transmitted over low frequency or high frequency radio transmission, such as those provided by radio stations maintained by the Bureau of Standards in Fort Collins, Colo. (WWV), or NIST in Kauai, Hi. (WVVH). In such embodiments, the signal may be received using a radio frequency receiver tuned to, for example, 60 kHz or 2.5, 5, 10, 15, or 20 MHz, in which case the optional communication interface 322 is an RF receiver. The received signal may alternatively be a GPS signal, received by an optional communication interface 322 that is a GPS receiver, that provides an accurate time signal.

Having a time-of-day signal is particularly helpful when devices are configured in one or more zones. While the time-of-day setting may be periodically programmed into each LCM 130 manually (e.g., via built-in controls) or automatically when one or more of the LCMs 130 is coupled to an external wired or wireless device, the various LCMs 130 in the zone or system may experience time drift over time and become unsynchronized. Having an optional communication interface 322 could maintain synchronization of the time-of-day settings of the various LCMs 130.

Of course, while described as an embodiment of the optional communication interface 322 on the auxiliary board 300, the Internet- or RF-enabled communication devices described above could alternatively be disposed on the primary board 148.

The auxiliary module 300 greatly expands the possible uses and use cases of the LCM 130. For instance, an LCM 130 that includes the auxiliary module 300 may have, plugged into one of the auxiliary ports 310 (e.g., the auxiliary port 310a), a USB-powered video camera (not shown) with its own wireless interface. The microprocessor 162 may be communicatively coupled to the USB-powered video camera (e.g., by the connections 316) and may be programmed, in addition to causing the lamp assembly 106 to illuminate, to cause the camera to transmit video via the camera's wireless interface when the sensor 102 detects motion in the monitored area. As another example, an ambient light sensor may be plugged into one of the auxiliary ports 310 (e.g., the auxiliary port 310a). The ambient light sensor may send to the microprocessor 162, via the connections 316 and 308, a variable signal indicative of the ambient lighting condition in the area of the LCM 130. The microprocessor 162 may be programmed to maintain (i.e., by controlling the dimming module 168) a minimum ambient light level in the absence of motion detected by the motion sensor 102, and may be programmed to increase the ambient light level in response to motion detected by the motion sensor 102. In another example, a wireless internet repeater may be plugged into one of the auxiliary ports 310 (e.g., the auxiliary port 310a). The wireless internet repeater may receive power from the auxiliary port but may have no need to communicate with the microprocessor 162. As such, in this example the auxiliary port 310a is merely a power supply for the wireless internet repeater.

In various embodiments, the auxiliary module 300 may be a riser or daughter board (as described above with reference to the auxiliary board 150 of FIG. 3) that is provided within the housing 140 of the LCM 130. In alternate embodiments, however, the auxiliary module 300 may take the form of a breakout box coupled by a connector or cable to the printed circuit board 148. That is, the connector 302 may be within and/or protruding from the housing 140, while the connector 304 may be within or protruding from a separate housing in which the auxiliary module 300 is disposed. In various embodiments, the connectors 302 and 304 may couple directly to one another, or may be physically and electrically coupled via an intermediary electrical cable (e.g., a ribbon cable, a USB cable, etc.)

Figure 10B:
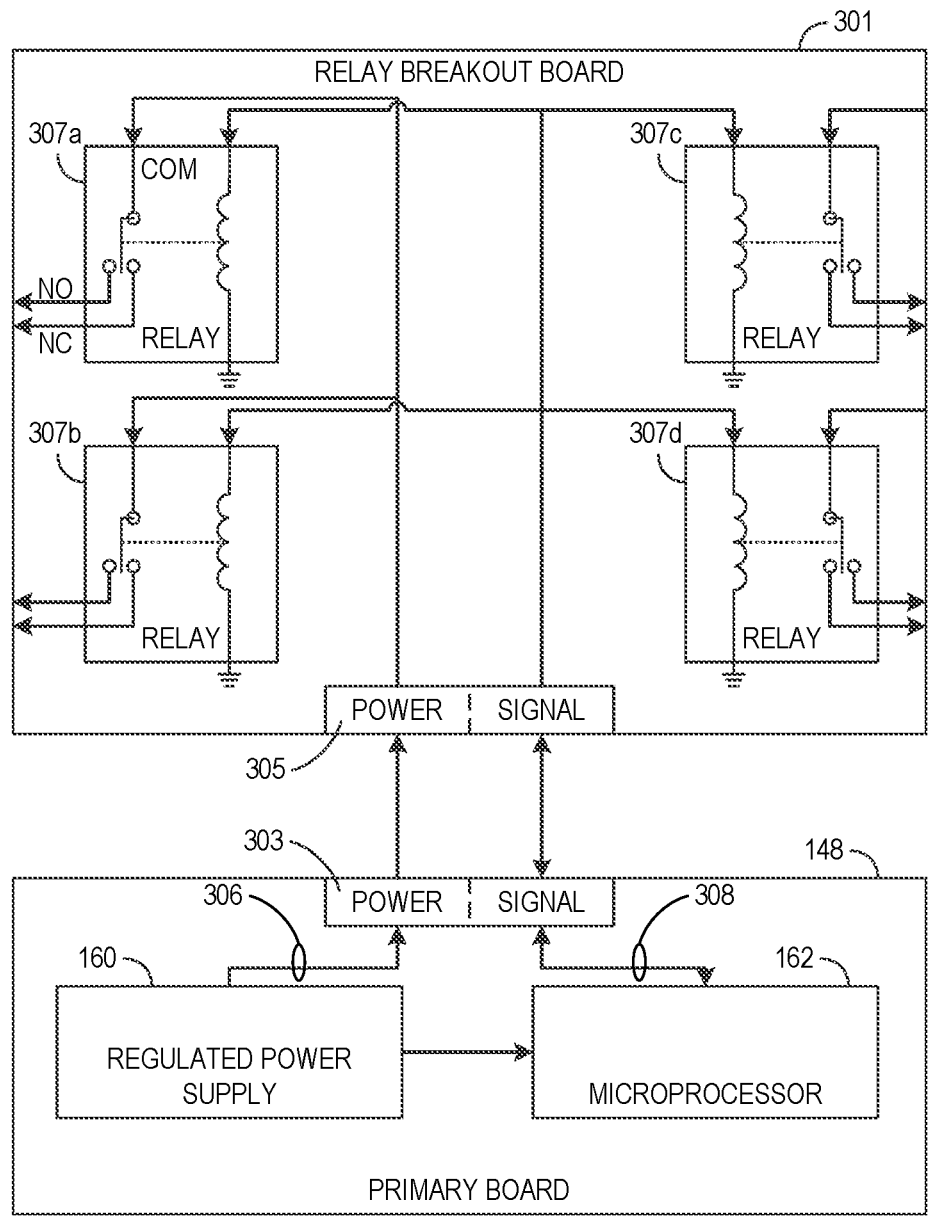
FIG. 10B is a block diagram depicting a lighting control module having an associated relay breakout module.

FIG. 10B illustrates a concept similar to the auxiliary module 300 depicted in FIG. 10A. In FIG. 10B, the primary board 148 is coupled to a relay breakout board 301. The relay breakout board 301 may be enclosed in a housing 448 (see FIG. 12B). Similar to the manner by which auxiliary module 300 provides additional power and/or communication ports for the LCM 130, the relay breakout board 301 may provide additional relays for the LCM 130. While any number of additional relays may be provided and present on the relay breakout board 301 (provided that sufficient power and communication resources are available to power and control the relays), FIG. 10B depicts four additional relays 307a-d. While not depicted in other figures, the primary circuit board 148 may include an additional connector 303 in embodiments in which the LCM 130 supports the relay breakout board 301. A corresponding connector 305 may be provided on the relay breakout board 301 for connecting the relay breakout board 301 to the primary circuit board 148. The connectors 303 and 305 may be coupled to one another directly or via an intermediary cable (e.g., a USB or ribbon cable).

Figure 12A:
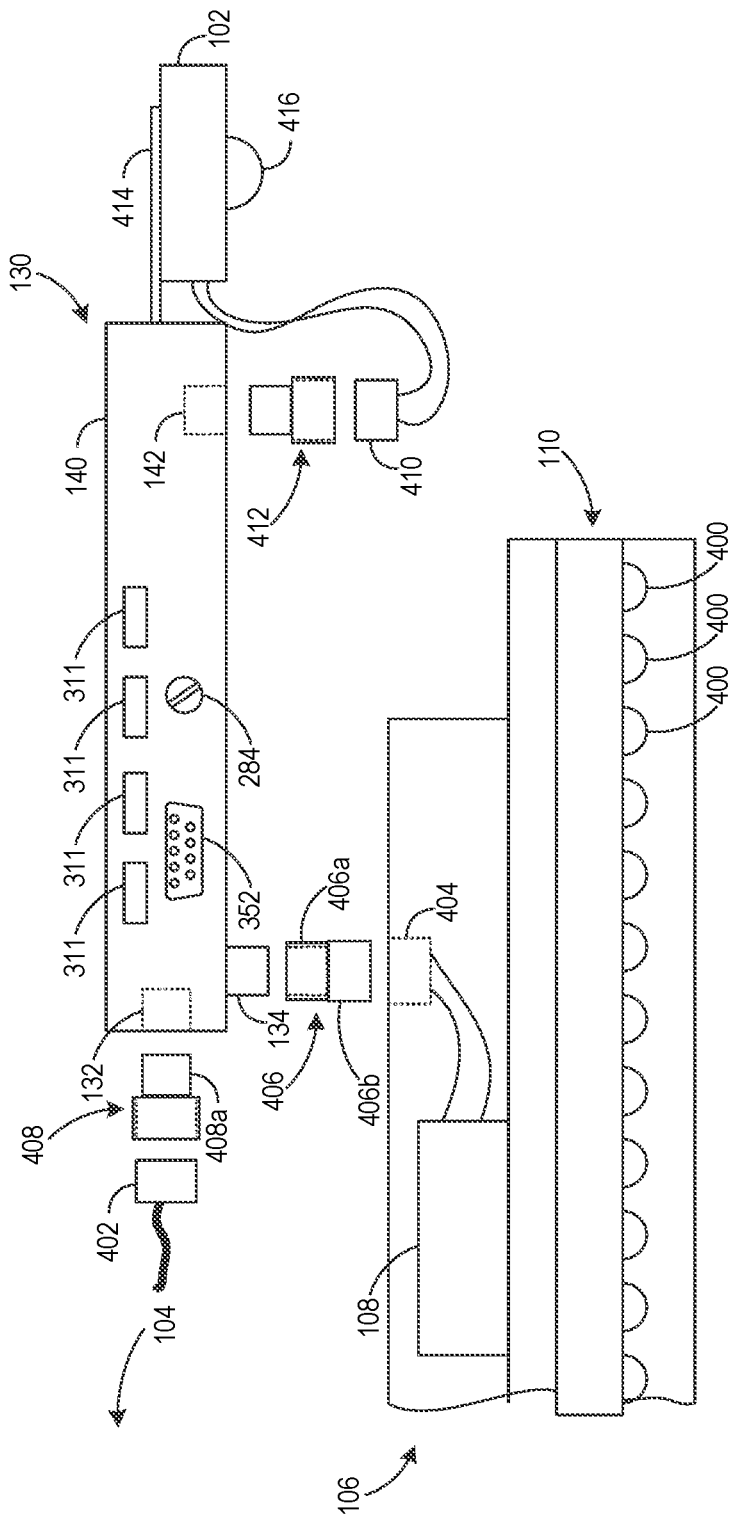
FIG. 12A illustrates the physical relationships and connections between the lamp assembly and the lighting control module in a first embodiment in which the auxiliary module is a riser or daughter board inside of a same housing as the motherboard.
Figure 12B:
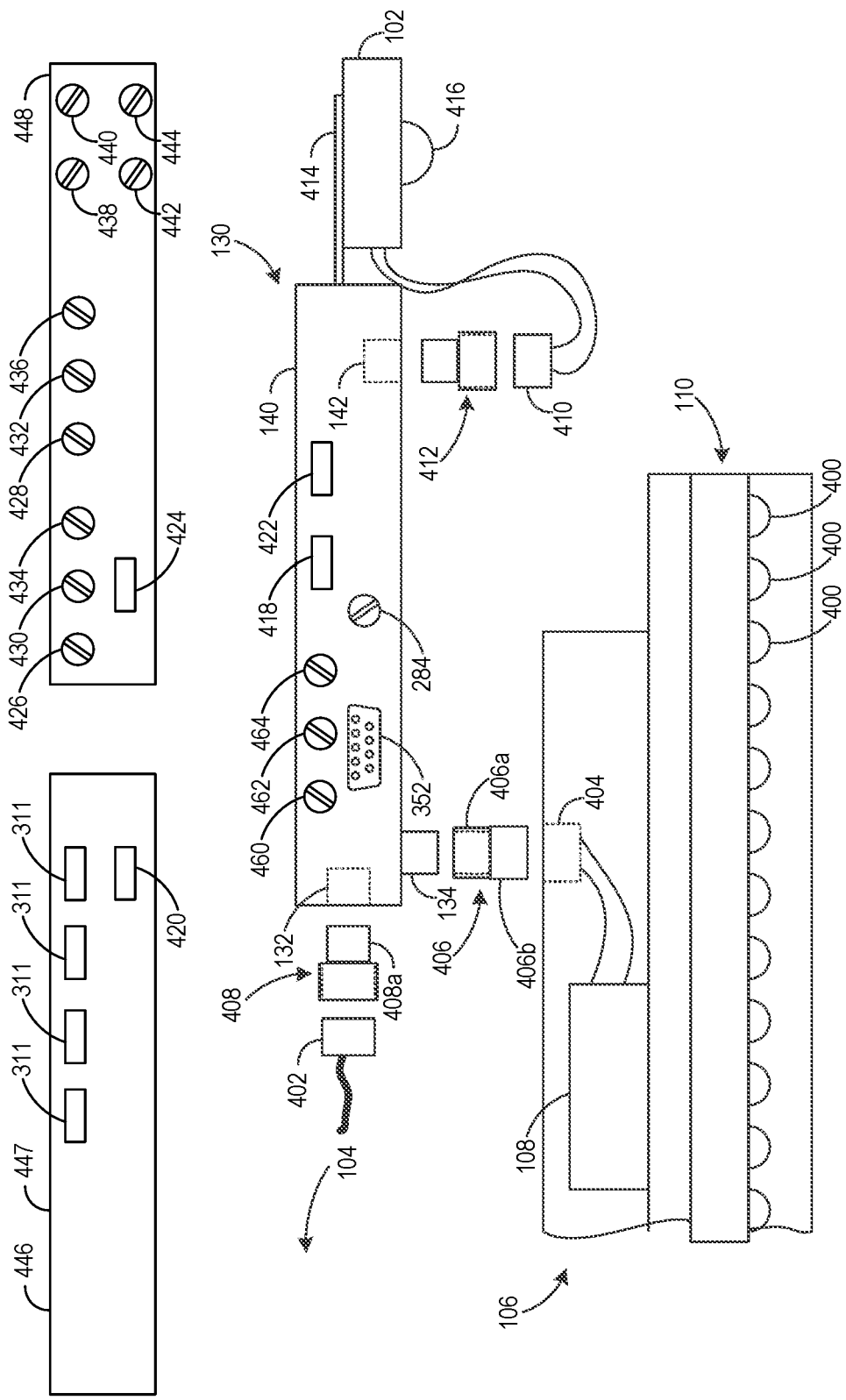
FIG. 12B illustrates the physical relationships and connections between the lamp assembly and the lighting control module in a second embodiment in which the auxiliary module is disposed in a breakout box and further illustrates a relay breakout box.

In any event, the connectors 303 and 305 may include both power and signal connections, in embodiments, such that the power to the common contacts for each relay may be provided to the relays from the regulated power supply 160, as depicted for the relays 307a and 307b in FIG. 10B. Alternatively, the connectors 303 and 305 may include only signal connections, configured to provide control signals to the relay to actuate the relay between the normally-open (NO) and normally-closed (NC) positions or between on and off positions in some cases, while power to the common contacts for each relay may be provided directly from another source (e.g., mains power) via a connector on the outside of the housing 448. Thus, in some embodiments, only NO and/or NC connections will be provided for each relay in the housing 448, while in other embodiments, NO, NC, and COM connections will be provided for reach relay in the housing 448. Both embodiments are illustrated in FIG. 12B.

The relay breakout board 301 may allow the microprocessor 162 to control more devices than would be possible with only the relays 170 and 172. As will be understood, the relays 307a-d (as well as the relays 170 and 172) may be controlled according to various signals received via the sensor 102, the wireless transceiver 164, and various auxiliary devices coupled to the auxiliary module 300, providing a variety of possible control schemes.

Figure 11:
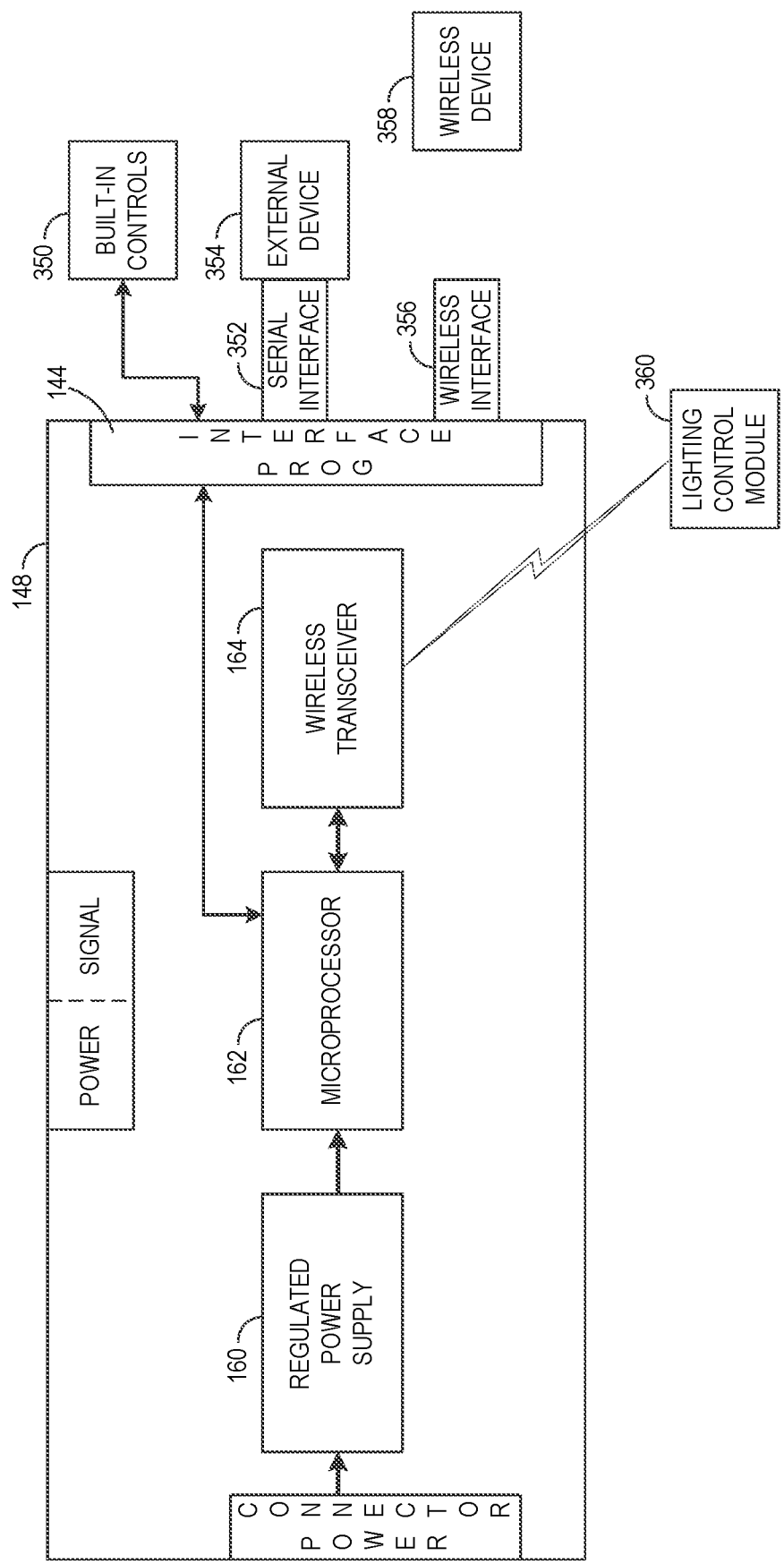
FIG. 11 is a block diagram illustrating various programming interfaces that may be associated with the lighting control module.

Turning now to FIG. 11, the circuit board 148 of the LCM 130 is depicted with a focus on the programming interface 144. The LCM 130 being a versatile and programmable device, it is necessary to provide one or more manners by which the logic executed by the microprocessor 162 may be programmed. While the LCM 130 may be provided to the user with a default set of computer-readable instructions stored on the memory 165, which instructions cause default behavior of the LCM 130 and/or provide an initial set of instructions that may be implemented and/or modified in various manners by a user, the user may require an interface to adjust the default behavior or, in embodiments, to add new behavior to the LCM 130.

In embodiments the programming interface 144 is electrically and communicatively coupled to a set of built-in controls 350 physically located on the circuit board 148, or disposed on the housing 140 and electrically and communicatively connected to the circuit board 148 through the programming interface 144. The built-in controls 350 may include one or more of a display, a touch-sensitive display, one or more buttons, etc., to allow a user to interact with the LCM 130 and program default functionality such as responses to sensor signals, lighting levels, time delays, and the like. In some embodiments, the built-in controls 350 may also allow the user to set various functionality with respect to other lighting control modules in the same zone or in different zones, to set the zone of the LCM 130, to set the unique ID of the LCM 130, to set the type of lamp assembly 106 connected to the LCM 130, to set the type of sensor 102 connected to the LCM 130, to select the output (relay 170 or dimming module 160) to which the lamp assembly 106 is connected, to set functionality of the relay 172, to adjust settings of the wireless transceiver 164 (e.g., preferred frequency band, address, etc.), and/or to adjust alarm limits such as temperature thresholds.

In some embodiments, the programming interface 144 includes a serial interface 352 via which an external device 354 may be coupled to the LCM 130 to program the functionality of the microprocessor 162. For example, the serial interface 352 may be a USB interface or an RS-232 interface (see FIGS. 12A and 12B) facilitating connection of a laptop (the external device 354) to the LCM 130. The external device 354 may execute software designed to allow the user to program the LCM 130 with desired behavior. For instance, the user may execute the software on the external device 354, select desired behavior of the LCM 130, and then connect the external device 354 to the LCM 130 via the serial interface 352 to send the instructions to the LCM 130 and, more particularly, to write the instructions to the computer-readable memory 165. Thereafter, the computer processor 163 may execute the instructions written to the computer-readable memory 165 to achieve the desired behavior of the LCM 130.

In still other embodiments, the programming interface 144 includes a wireless interface 356 configured to allow a wireless device 358 to communicate with the LCM 130 and, specifically, to program the functionality of the microprocessor 162. Of course, the wireless device 358 may be a laptop computer with a wireless interface card, and the wireless interface 356 may be a wireless internet (WiFi) transceiver. However, the wireless interface 356 may be any suitable wireless interface including, by way of example, a Bluetooth® wireless interface, and the wireless device 358 may be any wireless device adapted to communicate using the wireless interface 356 and having installed thereon the necessary software to select or otherwise program the desired behavior of the LCM 130 and transmit corresponding instructions to the LCM 130. Such devices include, by way of example, laptop computers, desktop computers, tablet computers, and smartphones, in addition to dedicated devices specifically designed to program the LCM 130.

The wireless interface 356 need not, in all embodiments that implement a wireless interface, be a wireless interface separate from the wireless transceiver 164. In fact, it is explicitly contemplated that the LCM 130 may be programmed via wireless communication between the external device 358 and the wireless transceiver 164. Moreover, it is explicitly contemplated that the wireless device that programs the LCM 130 via the wireless interface 356 may be another lighting control module 360 (e.g., another instance of the LCM 130, with the same or different properties as the LCM 130). In such embodiments, instructions may be propagated through the network of lighting control modules. A particular lighting control module (e.g., the LCM 360) may be programmed to propagate the same instructions/logic to each LCM in the same zone (or in a different zone), may send specific logic/instructions to particular LCMs (according to the unique identifiers of each), and/or may act as gateways to allow a user in communication with one LCM (e.g., in communication with the LCM 360 via the serial interface 352) to communicate instructions to another, remote LCM (e.g., the LCM 130), for example.

In any event, the LCM 130 may implement multiple ones of the various programming interfaces 144 described above. For instance, the LCM 130 may include the built-in set of controls 350, the serial interface 352, and the wireless interface 356 (which, in embodiments, is implemented via the wireless transceiver 164). Where multiple programming interfaces 144 are implemented, each may provide a different level of programming functionality to the user. For instance, the built-in set of controls 350 may facilitate programming of a zone in which the LCM 130 is located, of a timer value, and of a lighting level, while the wireless interface 356 may include programming access to every possible control feature of the lamp and, in fact, may facilitate programming of other lighting control modules in the network. That is, each of the programming interfaces may facilitate different—but possibly overlapping—programming of the LCM 130 and/or other lighting control modules. Additionally, In this manner, a user may select a programming interface based on his or her comfort level with the technology and/or based on his or her present needs.

The lighting control modules disclosed herein provide significant flexibility in the installation and/or upgrade of lighting systems, inasmuch as they are configured to work with multiple types of sensors and multiple types of lighting fixtures, require minimal re-wiring to install, and provide significant programmability in a compact package. FIGS. 12A and 12B illustrate still additional flexibility that may be achieved with some embodiments of the lighting control modules disclosed herein. In FIGS. 12A and 12B, the LCM 130 is depicted in the context of the sensor 102 and the lamp assembly 106, which includes the driver 108 and the lamp 110 (depicted in FIG. 12 as an array of LEDs 400). In the absence of the LCM 130, a modular connector 402 coupled to the power source 104 would connect directly to a corresponding modular connector 404 on the lamp assembly 106. That is, the connectors 402 and 404 are mating connectors, one being a plug ("male") and one being a socket ("female"). While the connectors 402 and 404 are depicted in FIGS. 12A and 12B as plug and socket, respectively, this configuration is for illustrative purposes only, and other embodiments may include connectors 402 and 404 that are, respectively, socket and plug.

The LCM 130 is configured to fit between the connectors 402 and 404. Specifically, the power connector 132 on the LCM 130 is configured to mate with the connector 402, while the lamp assembly connector 134 on the LCM 130 is configured to mate with the connector 404. In specific embodiments, the physical connection between the connectors 134 and 404 is configured to physically couple the LCM 130 to lamp assembly 106, such that the lamp assembly 106 physically supports the LCM 130.

As mentioned previously, the arrangement of the modular connectors may, in embodiments, facilitate the use of the LCM 130 as an adaptor between non-compatible connectors. For instance, with the LCM 130 in place, a user may replace the power source 104 or the lamp assembly 106 without regard to the respective connectors 402 and 404 on each, and without having to re-wire anything. In some embodiments, the user may employ an adapter 406 as depicted between the connectors 134 and 404 in FIGS. 12A and 12B. The adapter 406 may be supplied with the LCM 130 (or may be purchased separately from the supplier of the LCM 130) and may have a first side 406a configured to mate with the connector 134 and a second side 406b configured to mate with the connector 404. As such, a user desiring to replace the lamp assembly 106 with a lamp assembly having a connector 404 other than one that mates with the connector 134 could purchase/select the appropriate adapter 406 and install the new lamp assembly 106 without any rewiring. By contrast, in the absence of the LCM 130, the user replacing the lamp assembly 106 would likely be required to rewire the connector 402 to correspond to the new connector 404.

In other embodiments, the connections between the connectors 132 and 134 and the LCM 130 may themselves be modular such that the plug or socket serving as the connector 132 or 134 may be removed and replaced with a different connector to adapt the LCM 130 to the modular connector 402 on the power source 104 or the modular connector 404 on the lamp assembly 106. For example, the connector 132 on the LCM 130 may take the form of an array of electrical contacts configured to mate with an insertable cartridge 408 that cooperates with the electrical contacts to create the connector 132 that mates with the connector 402. For each of the various available insertable cartridges 408 created to mate with different connectors 402, a first side 408a of the cartridge 408 is the same—designed to mate with the array of electrical contacts—while a second side 408b of the cartridge 408 differs from cartridge to cartridge to mate with different connectors 402. It should be understood that while one embodiment is depicted in FIGS. 12A and 12B with respect to the lamp assembly connector 134 and the other embodiment is depicted in FIGS. 12A and 12B with respect to the power connector 132, either embodiment may be employed with either of the connectors.

FIGS. 12A and 12B also depict a similar, modular arrangement for the sensor connection means 142. Specifically, the sensor connection means 142 may include a modular connector configured to mate with a modular connector 410 electrically coupled to the sensor 102. Like the connections between the LCM 130 and the power source 104 and the lamp assembly 106, the connection between the LCM 130 and the sensor 102 may employ an adapter 412 where desired/required. Additionally, while it should be understood, the arrangement and position of the connectors with respect to each other, and with respect to other components in the device, as depicted in the various figures herein, is non-limiting. That is, the positions of the connectors, as depicted in the figures, is exemplary only, and not intended to limit the scope of the attached claims in any manner.

In embodiments, the LCM 130 is configured to support the sensor 102. While depicted in FIGS. 12A and 12B as supported by a bracket 414, the sensor 102 may be supported in any conceivable way in which the sensor 102 remains functional (i.e., where the sensor 102 can operate without being obstructed or interfered with by the housing 140 of the LCM 130). Accordingly, the sensor 102 may be physically coupled to the housing 140 by a screw or bolt, may be affixed with adhesive to the outside of the housing 140, may be mounted inside of the housing 140 such that a sensing element 416 is exposed via an aperture in the housing 140, etc. In other embodiments, the sensor 102 may be mounted to the lamp assembly directly, while electrically coupled to the LCM 130 via the connector 410 and the sensor connection means 142.

While FIG. 12A depicts an embodiment in which the auxiliary module 300 is included within the housing 140 of the LCM 130, FIG. 12B instead depicts an embodiment in which the auxiliary module 300 is disposed in a breakout box 446 having its own housing 447. Thus, in the embodiment depicted in FIG. 12B, the openings 311 through which the auxiliary ports 310a-d are accessible are located in the housing 447 of the breakout box 446. Similarly, the connector 304 of the auxiliary board 300 (see FIG. 10A) is accessible through an opening 420 in the housing 447 of the breakout box 446, while the connector 302 of the primary board 148 is accessible through an opening 418 in the housing 140. An electrical connection (e.g., a USB or ribbon cable) may couple the connectors 302 and 304 to one another, through the openings 418 and 420, respectively.

In embodiments, it may be possible to daisy-chain multiple auxiliary modules 300, such that the breakout box 446 may be coupled, for example to the LCM 130 via one of the ports 310a-d in the LCM depicted in FIG. 12A. That is, the LCM 130 may have a first auxiliary module 300 within the housing 140, having ports 310a-d accessible via openings 311 in the housing 140, and a second auxiliary module 300, disposed in the breakout box 446 may be coupled to the first auxiliary module 300 (e.g., by an electrical connection between the connector 304 of the second auxiliary module 300—via the opening 420 in the housing 447—and one of the ports 310a-d—via an opening 311 in the housing 140). In this manner, the availability of ports for powering and/or controlling auxiliary devices may be expanded beyond a single auxiliary module 300 without respect to the space available within the housing 140 of the LCM 130.

FIG. 12B also depicts the relay breakout board 301 in its housing 448. Thus, in the embodiment depicted in FIG. 12B, the connector 305 of the relay breakout board 301 (see FIG. 10B) is accessible through an opening 424 in the housing 448, while the connector 303 of the primary board 148 is accessible through an opening 422 in the housing 140. An electrical connection (e.g., a USB or ribbon cable) may couple the connectors 303 and 305 to one another, through the openings 422 and 424, respectively.

The housing 448 may have a variety of termination/connection points accessible through the housing 448 or physically on the outside of the housing 448. Either way, each of the connection points is electrically coupled to a corresponding contact on one of the relays on the relay breakout board 301. Continuing with the example of depicted in FIG. 10B, contacts 426 and 430 depicted in FIG. 12B may be electrically coupled, respectively, to the NO and NC contacts of the relay 307c, while contacts 428 and 432 depicted in FIG. 12B may be electrically coupled, respectively, to the NO and NC contacts of the relay 307d, and contacts 434 and 436 may be electrically coupled, respectively, to the common contacts of the relays 307c and 307d. Contacts 438 and 440 depicted in FIG. 12B may be electrically coupled, respectively, to the NO and NC contacts of the relay 307a, while contacts 442 and 444 depicted in FIG. 12B may be electrically coupled, respectively, to the NO and NC contacts of the relay 307b. It should be understood that more or fewer contacts may be present on the housing 448, according to how many relays are present on the relay breakout board 301, according to whether the common contacts are coupled to power via the connectors 303 and 305, and according to the type of relay. While FIG. 12B depicts relays having two different connection schemes, in various embodiments the relay breakout board 301 may include only relays connected as depicted with respect to relays 307a-b, may include only relays connected as depicted with respect to relays 307c-d, or some combination of both, as will be appreciated.

In still other embodiments, one should understand that the relay breakout board 301 may be combined with an auxiliary module 300 such that the devices and components depicted in the housings 447 and 448 in FIG. 12B may be within a single housing that provides some combination of additional relays and auxiliary ports.

Still additionally, it should be understood that the relays 170 and 172, while each depicted in FIGS. 4, 5, 8, and 9 as having its respective common (COM) connection coupled to power through the power connector 132 or through the regulated power supply 150, may each have a common (COM) connection that is coupled to a power source through a connector in the housing 148 in a manner similar to the manner in which the additional relays 307c-d have their common (COM) connections coupled to power through the contacts 434 and 436 disposed on the housing 448 of the relay breakout board. Similarly, external contacts may provide electrical connectivity to normally-opened or normally-closed contacts of the relay 170 and/or the relay 172. Thus, referring to FIG. 12B, contacts 460 and 462 may be electrically connected to the NO and NC contacts of the relay 172, while a contact 464 may be electrically connected to the COM contact of the relay 172. One or more similar contacts (not shown) may be provided for the relay 170, in embodiments. Of course, it should also be understood that there is no requirement that both of the relays 170 and 172 be configured in the same manner and/or with the same external contacts. Further, in embodiments one or both of the relays 170 and 172 may have only the common connection provided by means of an external contact (e.g., the contract 464), while the normally-opened and normally-closed contacts are provided to external devices via other connectors (such as the lamp assembly connector 134). In embodiments (of both the relay breakout board and the primary board), external contacts may be provided in the housings 448 and 148, respectively, and whether power the external contacts are coupled to the respective relays may be selected via jumpers on the respective boards. By way of example, a jumper may be placed in a first position to couple the common contact of a relay (e.g., the relay 172) with an external contact (e.g., the contact 464), may be placed in a second position to couple the common contact of the relay to power from the power connector 132 or to power from the regulated power supply 160.

Figure 13:
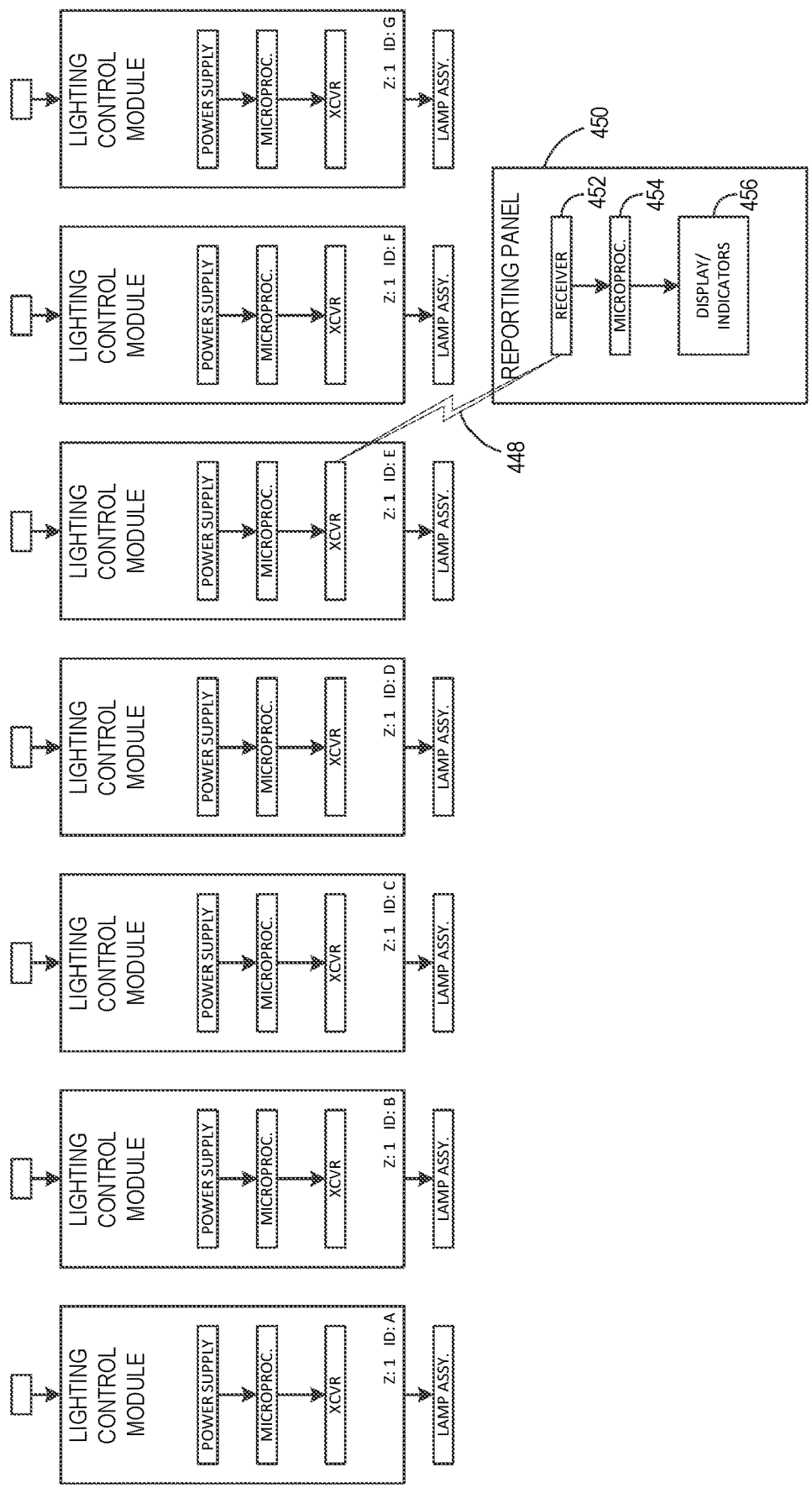
FIG. 13 illustrates a surge suppression reporting system that may be implemented using the lighting control modules described herein.

FIG. 13 illustrates yet another feature of the LCM 130. As described above, the LCM 130 may be configured such that the regulated power supply 160 includes built-in transient voltage surge suppression (TVSS) circuitry 158 providing surge suppression/protection up to, for example, 10 kA. In embodiments, the TVSS circuitry 158 is configured to detect the occurrence of a surge and to generate a corresponding signal to the microprocessor 162 to alert the microprocessor 162 that a surge has occurred. In embodiments, the microprocessor 162 is configured (i.e., programmed) to register the occurrence of a surge and report the occurrence of the surge and the LCM in which the surge was detected. The report of the occurrence of the surge may be useful to maintenance personnel to determine when a lamp assembly is faulty, to determine that the power source is behaving erratically, etc. By way of example, FIG. 13 depicts seven LCMs having unique identifiers A-G. A surge detected by the TVSS circuitry 158 in the power supply of the LCM having identifier "E" would cause a signal to be received from the power supply of the LCM "E" at the microprocessor of the LCM "E." The microprocessor would cause the wireless transceiver of the LCM "E" to send a reporting message 448 reporting that LCM "E" had detected a surge event. The reporting message may include the unique identifier of the LCM reporting the surge event (i.e., LCM "E"), as well as a message indicating that a surge had been detected and, in embodiments, a date/time stamp corresponding to the time that the surge occurred. Further, the reporting message may include LCM or TVSS circuitry health status, a status of the local reserve power source 161, a count of a number of surges prevented by the TVSS circuitry 158, an estimated remaining life of the TVSS circuitry 158, an indication to replace the TVSS circuitry 158, TVSS circuitry failure information, a TVSS fuse-blown indication, and/or a power loss indication (some of which would require the implementation of the local reserve power source 161).

The reporting message 448 may be received, for example, by a reporting panel 450. The reporting panel 450 may include a wireless receiver 452 configured to receive the reporting message 448 from the wireless transceiver of the LCM. The wireless receiver 452 may be communicatively coupled to a microprocessor 454 that is programmed to register the received reporting message 448, to determine from the reporting message 448 the location of the detected surge (e.g., LCM "E"), and to display the fact that a surge occurred, and the location of the surge, on a display screen or indicator 456. In some embodiments, for instance, the display 456 takes the form of a series of LEDs, each corresponding to one of the LCMs (or the corresponding lamp assemblies) and labeled as such. In other embodiments, however, the display 456 is a digital display (e.g., a display screen or monitor) that may depict on a graphical user interface (GUI) the arrangement of the LCMs and associated lamp assemblies, and may show—by highlighting, blinking, or otherwise—any LCM for which a reporting message has been received.

The LCM 130 may also include functionality that allows one or more devices coupled to the LCM 130 to be power cycled. For example, the microprocessor 162 may be programmable (e.g., by a command received via the wireless transceiver 164) to cause power to the sensor 102 to be cycled when the sensor 102 appears to be malfunctioning or defective, or due to security concerns. Such power cycling may be automatic (e.g., performed when certain criteria, programmed into the microprocessor 162, are met) or may be manual (e.g., upon a command received via the wireless transceiver 164). In another example, the relay 172 may be coupled to a device that occasionally needs to be power cycled, and the microprocessor 162 may cause the relay 172 to power cycle the device coupled to it. In still another example, a sensor or device coupled to the auxiliary module 300 (via one of the ports 310a-d) may be power cycled according to commands from the microprocessor 162 that, for instance, cause the auxiliary module 300 to momentarily remove power from the corresponding power supply 312a-d.

While the LCM 130 and the functionality thereof are described throughout this specification in the context of a sensor 102 that detects motion and/or occupancy, other types of sensors may be used as the sensor 102, provided that the sensor 102 provides an on/off AC output (e.g., that can be detected by the AC sense circuit 166) or a variable AC output signal (e.g., that can be detected by the dimming module 168) or, if another type of signal is output by the sensor 102, provided that the sensor 102 provides a signal that the LCM 130 is adapted to receive and that the microprocessor 162 is configured to process. Thus, while described as detecting motion in a monitored area, the sensor 102 should be understood as detecting a sensed parameter in a monitored area, regardless of whether the sensed parameter is motion, occupancy, temperature, ambient light, noise, smoke, carbon monoxide, or another parameter.

Additionally, while the microprocessor 162 may be described in this specification as "executing logic," performing an action, or programmed to perform an action, it should be understood that such references refer to the performance of the microprocessor 162 and, specifically, refer to the performance of the computing unit 163 that is specially configured and programmed according to a set of computer-readable instructions designed to cause the actions or comprising the logic executed and, in embodiments, to cause output signals on physical pins of processor to occur according, at times, to inputs received on other physical pins of the processor. Moreover, it should be understood that the computer-readable instructions will be stored in the memory device 165 (i.e., in a tangible, non-transitory computer-readable medium). Thus, to the extent that reference is made to programming the LCM or programming the microprocessor 162, such references refer to writing computer-readable instructions to the memory 165 and/or causing the computing unit 163 to read the computer-readable instructions from the memory 165 and execute the instructions to perform an action.

The computer-readable instructions may include instructions that, when executed by the computing unit 163, cause the computing unit 163 to respond to input variables and perform output actions. Without limitation, exemplary input variables include: an indication that the sensor 102 is outputting an AC signal; an indication of a voltage output by the sensor 102; a time of day; a day of the week; a date; an ambient lighting level; a temperature; a command or other message received by the wireless transceiver; a lighting set point; a signal from a device communicatively coupled to a port of an auxiliary module. Also without limitation, exemplary output actions include: turning on a relay (i.e., providing a voltage signal to the primary contacts of the relay to cause an output on a secondary contact of the relay); turning off a relay; adjusting (including to zero or from zero) a voltage from the microprocessor to the dimming module; causing the wireless transceiver to send a command or other message to one or more other lighting control modules; sending a signal to a device communicatively coupled to a port of an auxiliary module.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A lighting control module comprising: a first input configured to receive, from a sensor, a sensor signal indicative of motion and/or occupancy, and in response to the sensor signal, to output a first corresponding signal; a microprocessor configured to receive the first corresponding signal from the first input and in response to receiving the first corresponding signal, transmit a second corresponding signal; a wireless transceiver communicatively coupled to the microprocessor and configured to communicate with one or more other lighting control modules; a relay configured to selectively provide power to a relay output that is configured to be electrically coupled to a lighting fixture, the relay configured to selectively provide the power to the relay output according to a first relay-control signal from the microprocessor; a regulated power supply; a power input configured to couple the regulated power supply to an external power source; and a dimming module configured to be coupled to a lighting fixture and further configured to, when coupled to the lighting fixture, output a signal to the lighting fixture, wherein the lighting control module is configured to receive from the sensor the sensor signal, and in response to the sensor signal cause the lighting fixture to change its state of operation.

2. A lighting control module according to aspect 1, wherein the first input is coupled to a circuit configured to sense AC power, and wherein the first corresponding signal is indicative of the presence of AC power at the first input.

3. A lighting control module according to aspect 2, wherein the circuit configured to sense AC power comprises an optoelectronic isolator circuit.

4. A lighting control module according to aspect 2 or aspect 3, wherein the second corresponding signal comprises the first relay-control signal and wherein the second corresponding signal is configured to actuate the relay to power the relay output to power the lighting fixture.

5. A lighting control module according to any one of aspects 1 to 4, wherein the first input is coupled to the dimming module, and wherein the first corresponding signal is indicative of a dimming level.

6. A lighting control module according to aspect 5, wherein the dimming module receives the second corresponding signal and wherein the signal output to the lighting fixture from the dimming module powers the lighting fixture.

7. A lighting control module according to any one of aspects 1 to 6, wherein the regulated power supply includes protective circuitry.

8. A lighting control module according to aspect 7, wherein the protective circuitry protects against 10 kA surges.

9. A lighting control module according to any one of aspects 1 to 8, further comprising a second relay configured to selectively provide power via an output of the second relay according to a second relay-control signal.

10. A lighting control module according to aspect 9, wherein the second relay-control signal originates at the microprocessor.

11. A lighting control module according to aspect 9, wherein the second relay-control signal originates at a source external to the lighting control module.

12. A lighting control module according to aspect 11, wherein the output of the second relay is coupled to the lighting fixture.

13. A lighting control module according to any one of aspects 9 to 11, wherein the output of the second relay is coupled to a lighting device not part of the lighting fixture.

14. A lighting control module according to any one of aspects 1 to 13, wherein the microprocessor is configured to respond to a wireless signal, received by the wireless transceiver from a second lighting control module, by causing a change to the state of the lighting fixture.

15. A lighting control module according to any one of aspects 1 to 14, wherein the microprocessor is configured to cause the wireless transceiver to transmit a wireless signal to one or more other lighting control modules to cause one or more other lighting fixtures corresponding to the one or more other lighting control modules to change state.

16. A lighting control module according to any one of aspects 1 to 15, wherein the microprocessor is configured to respond to a wireless signal, received by the wireless transceiver from a second lighting control module, by causing the wireless transceiver to send a second wireless signal to one or more third lighting control modules to cause one or more other lighting fixtures corresponding to the one or more third lighting control modules to change state.

17. A lighting control module according to any one of aspects 1 to 16, further comprising a housing in which each of the first input, the microprocessor, the wireless transceiver, the relay, the regulated power supply, the power input, and the dimming module is disposed.

18. A lighting control module according to aspect 17, further comprising a fixture-side modular connector configured to electrically couple the lighting control module to the lighting fixture.

19. A lighting control module according to aspect 18, wherein the fixture-side modular connector comprises: a first component irremovably coupled to each of the regulated power supply, the relay output, and the dimming module; and a second component configured to be removably coupled to each of the first component and a corresponding modular connector on the lighting fixture.

20. A lighting control module according to any one of aspects 17 to 19, further comprising a power-side modular connector configured to electrically couple the lighting control module to an electrical power source.

21. A lighting control module according to aspect 20, wherein the power-side modular connector comprises: a first component irremovably coupled to each of the regulated power supply, the sensor, a relay input; and a second component configured to be removably coupled to each of the first component and a corresponding modular connector electrically coupled to the electrical power source.

22. A lighting control module according to any one of aspects 17 to 21, wherein the sensor is fitted to the housing.

23. A lighting control module according to any one of aspects 1 to 22, further comprising a programming interface configured to facilitate programming of the microprocessor.

24. A lighting control module according to aspect 23, wherein the programming interface comprises a set of user controls on the lighting control module.

25. A lighting control module according to aspect 23 or aspect 24, wherein the programming interfaces comprises a serial port configured to be coupled to a computing device for programming the microprocessor.

26. A lighting control module according to any one of aspects 23 to 25, wherein the programming interface comprises a wireless programming interface configured to facilitate communication between the microprocessor and a computing device not physically coupled to the lighting control module.

27. A lighting control module according to aspect 26, wherein the computing device not physically coupled to the lighting control module is a second lighting control module.

28. A lighting control module according to any one of aspects 1 to 27, further comprising an auxiliary module configured provide power to one or more auxiliary devices.

29. A lighting control module according to aspect 28, wherein the auxiliary module provides power to the one or more auxiliary devices via one or more corresponding Universal Serial Bus (USB) connections.

30. A lighting control module according to aspect 28 or aspect 29, wherein the auxiliary module is further configured such that at least one of the one or more auxiliary devices is communicatively coupled to the microprocessor.

31. A lighting control module according to any one of aspects 28 to 30, wherein the auxiliary module is electrically coupled to the regulated power supply and configured such that regulated power from the regulated power supply is provided to the one or more auxiliary devices.

32. A lighting control module according to aspect 31, wherein the auxiliary module is configured with one or more power supplies, each of which receives regulated power from the regulated power supply, and each of which provides power to a respective one of the one or more auxiliary devices.

33. A lighting control module according to any one of aspects 28 to 32, wherein the auxiliary module receives filtered AC power from the regulated power supply and is further communicatively coupled to the microprocessor.

34. A lighting control module according to any one of aspects 28 to 33, wherein the wireless transceiver, the microprocessor, the relay, the regulated power supply, and the dimming module are all disposed on a first printed circuit board and wherein the auxiliary module comprises a second printed circuit board.

35. A lighting control module according to any one of aspects 1 to 34, wherein the wireless transceiver, the microprocessor, the relay, the regulated power supply, and the dimming module are all disposed on a first printed circuit board.

36. A lighting control module according to any one of aspects 1 to 35, wherein the regulated power supply includes protective circuitry and wherein the lighting fixture is electrically protected by the protective circuitry in the regulated power supply.

37. A lighting fixture according to aspect 36, wherein the microprocessor is configured to recognize instances in which the protective circuitry has protected the lighting control module from a power anomaly, and to transmit to another device a signal reporting such instances.

38. A lighting control module according to any one of aspects 1 to 37, wherein the wireless transceiver, the microprocessor, the relay, the regulated power supply, and the dimming module are all disposed in a housing, and wherein the housing is configured to mount to the lighting fixture via a fixture-side modular connector through which electrical power is selectively provided to the lighting fixture.

39. A lighting control module according to any one of aspects 1 to 38, further comprising a local reserve power source configured to provide momentary power to the microprocessor and the wireless transceiver in the event that the external power source fails.

40. A lighting control module according to aspect 7, further comprising circuitry to monitor the health of the protective circuitry.

41. A lighting control module according to any one of aspects 1 to 40, further comprising a relay breakout board providing one or more additional relays.

42. A lighting control module according to any one of aspects 1 to 40, further comprising: a relay breakout board providing one or more additional relays; and an auxiliary module configured to provide power to one or more auxiliary devices.

43. A lighting control module according to aspect 42, wherein the relay breakout board and the auxiliary module are within a same housing.

44. A lighting control module according to aspect 43, wherein the housing in which the relay breakout board and the auxiliary module are disposed has disposed in it a single circuit board comprising the auxiliary module and having mounted thereon the additional relays.

45. A lighting control module according to any one of aspects 41 to 44, wherein the additional relays are controlled by the microprocessor.

46. A lighting control module according to any one of aspects 28 to 34, wherein the auxiliary module is disposed in a second housing separate from the housing in which the first input, the microprocessor, the wireless transceiver, the relay, the regulated power supply, the power input, and the dimming module are disposed.

47. A lighting control module according to aspect 46, wherein the auxiliary module is configured to be electrically and/or communicatively coupled to a second auxiliary module.

48. A system comprising: a sensor; a lighting fixture; a lighting control module coupled to the lighting fixture and the sensor, and to an external power source, the lighting control module comprising: a first input configured to receive from the sensor a sensor signal indicative of motion and/or occupancy and in response to the sensor signal, output a first corresponding signal; a microprocessor configured to receive the first corresponding signal from the first input and in response to receiving the first corresponding signal, transmit a second corresponding signal; a wireless transceiver communicatively coupled to the microprocessor and configured to communicate with one or more other lighting control modules; a relay configured to selectively provide power to a relay output that is configured to be electrically coupled to a lighting fixture, the relay configured to selectively provide the power to the relay output according to a first relay-control signal from the microprocessor; a regulated power supply; a power input configured to couple the regulated power supply to the external power source; and a dimming module configured to be coupled to a lighting fixture and further configured to, when coupled to the lighting fixture, output a signal to the lighting fixture, wherein the lighting control module is configured to receive from the sensor the sensor signal, and in response to the sensor signal cause the lighting fixture to change its state of operation.

49. A system according to aspect 48, wherein the lighting fixture is electrically coupled to the relay output.

50. A system according to aspect 48, wherein the lighting fixture is electrically coupled to the dimming module.

51. A system according to any one of aspects 48 to 50, further comprising the one or more other lighting control modules.

52. A system according to any one of aspects 48 to 50, wherein the lighting control module comprises the lighting control module of any one of aspects 2 through 47.

What is claimed:

1. A lighting control module comprising:
   a first input configured to receive, from a sensor, a sensor signal indicative of motion and/or occupancy, and in response to the sensor signal, to output a first corresponding signal;
   a microprocessor configured to receive the first corresponding signal from the first input and in response to receiving the first corresponding signal, transmit a second corresponding signal;
   a wireless transceiver communicatively coupled to the microprocessor and configured to communicate with one or more other lighting control modules;
   a relay configured to selectively provide power to a relay output, the relay configured to selectively provide the power to the relay output according to a first relay-control signal from the microprocessor;
   a regulated power supply;
   a power input configured to couple the regulated power supply to an external power source; and
   a dimming module configured to provide power to a dimming output, wherein the relay output and the dimming output are each configured to be coupled to a lighting fixture and wherein the dimming module is further configured to, when coupled to the lighting fixture, output a signal to the lighting fixture;
   an auxiliary module configured to provide power to a plurality of auxiliary devices,
   wherein the lighting control module is configured to receive from the sensor the sensor signal, and in response to the sensor signal cause the lighting fixture to change its state of operation, and
   wherein the wireless transceiver, the microprocessor, the relay, the regulated power supply, and the dimming module are all disposed on a first printed circuit board and wherein the auxiliary module comprises a second printed circuit board.

2. A lighting control module according to claim 1, wherein the first input is coupled to a circuit configured to sense AC power, and wherein the first corresponding signal is indicative of the presence of AC power at the first input.

3. A lighting control module according to claim 2, wherein the second corresponding signal comprises the first relay-control signal and wherein the second corresponding signal is configured to actuate the relay to power the relay output to power the lighting fixture.

4. A lighting control module according to claim 1, wherein the first input is coupled to the dimming module, and wherein the first corresponding signal is indicative of a dimming level.

5. A lighting control module according to claim 4, wherein the dimming module receives the second corresponding signal and wherein the signal output to the lighting fixture from the dimming module powers the lighting fixture.

6. A lighting control module according to claim 1, wherein the regulated power supply includes protective circuitry.

7. A lighting control module according to claim 1, further comprising a second relay configured to selectively provide power via an output of the second relay according to a second relay-control signal.

8. A lighting control module according to claim 7, wherein the output of the second relay is coupled to a lighting device not part of the lighting fixture.

9. A lighting control module according to claim 1, wherein the microprocessor is configured to respond to a wireless signal, received by the wireless transceiver from a second lighting control module, by causing a change to the state of the lighting fixture.

10. A lighting control module according to claim 1, wherein the microprocessor is configured to cause the wireless transceiver to transmit a wireless signal to one or more other lighting control modules to cause one or more other lighting fixtures corresponding to the one or more other lighting control modules to change state.

11. A lighting control module according to claim 1, wherein the microprocessor is configured to respond to a wireless signal, received by the wireless transceiver from a second lighting control module, by causing the wireless transceiver to send a second wireless signal to one or more third lighting control modules to cause one or more other lighting fixtures corresponding to the one or more third lighting control modules to change state.

12. A lighting control module according to claim 1, further comprising a programming interface configured to facilitate programming of the microprocessor.

13. A lighting control module according to claim 1, wherein the auxiliary module provides power to one or more of the plurality of auxiliary devices via one or more corresponding Universal Serial Bus (USB) connections.

14. A lighting control module according to claim 1, wherein the auxiliary module is further configured such that at least one of the plurality of auxiliary devices is communicatively coupled to the microprocessor.

15. A lighting control module according to claim 1, wherein the regulated power supply includes protective circuitry and wherein the lighting fixture is electrically protected by the protective circuitry in the regulated power supply.

16. A lighting fixture according to claim 15, wherein the microprocessor is configured to recognize instances in which the protective circuitry has protected the lighting control module from a power anomaly, and to transmit to another device a signal reporting such instances.

17. A lighting control module according to claim 1, wherein the wireless transceiver, the microprocessor, the relay, the regulated power supply, and the dimming module are all disposed in a housing, and wherein the housing is configured to mount to the lighting fixture via a fixture-side modular connector through which electrical power is selectively provided to the lighting fixture.

18. A system comprising:
a sensor;
a lighting fixture;
a lighting control module coupled to the lighting fixture and the sensor, and to an external power source, the lighting control module comprising:
a first input configured to receive from the sensor a sensor signal indicative of motion and/or occupancy and in response to the sensor signal, output a first corresponding signal;
a microprocessor configured to receive the first corresponding signal from the first input and in response to receiving the first corresponding signal, transmit a second corresponding signal;
a wireless transceiver communicatively coupled to the microprocessor and configured to communicate with one or more other lighting control modules;
a relay configured to selectively provide power to a relay output, the relay configured to selectively provide the power to the relay output according to a first relay-control signal from the microprocessor;
a regulated power supply;
a power input configured to couple the regulated power supply to the external power source; and
a dimming module configured to provide power to a dimming output, wherein the relay output and the dimming output are each configured to be coupled to a lighting fixture and wherein the dimming module is further configured to, when coupled to the lighting fixture, output a signal to the lighting fixture;
an auxiliary module configured to provide power to a plurality of auxiliary devices,
wherein the lighting control module is configured to receive from the sensor the sensor signal, and in response to the sensor signal cause the lighting fixture to change its state of operation, and
wherein the wireless transceiver, the microprocessor, the relay, the regulated power supply, and the dimming module are all disposed on a first printed circuit board and wherein the auxiliary module comprises a second printed circuit board.

19. A lighting control module comprising:
a first input configured to receive, from a sensor, a sensor signal indicative of motion and/or occupancy, and in response to the sensor signal, to output a first corresponding signal;
a microprocessor configured to receive the first corresponding signal from the first input and in response to receiving the first corresponding signal, transmit a second corresponding signal;
a wireless transceiver communicatively coupled to the microprocessor and configured to communicate with one or more other lighting control modules;
a relay configured to selectively provide power to a relay output, the relay configured to selectively provide the power to the relay output according to a first relay-control signal from the microprocessor;
a regulated power supply;
a power input configured to couple the regulated power supply to an external power source; and
a dimming module configured to provide power to a dimming output, wherein the relay output and the dimming output are each configured to be coupled to a lighting fixture and wherein the dimming module is further configured to, when coupled to the lighting fixture, output a signal to the lighting fixture,
wherein the lighting control module is configured to receive from the sensor the sensor signal, and in response to the sensor signal cause the lighting fixture to change its state of operation,
wherein the regulated power supply includes protective circuitry and wherein the lighting fixture is electrically protected by the protective circuitry in the regulated power supply, and
wherein the microprocessor is configured to recognize instances in which the protective circuitry has protected the lighting control module from a power anomaly, and to transmit to another device a signal reporting such instances.

* * * * *